(12) United States Patent
Franc et al.

(10) Patent No.: US 10,504,038 B2
(45) Date of Patent: Dec. 10, 2019

(54) REFINED LEARNING DATA REPRESENTATION FOR CLASSIFIERS

(71) Applicant: Cisco Technology, Inc., San Jose, CA (US)

(72) Inventors: Vojtech Franc, Roudnice Nad Labem (CZ); Karel Bartos, Prague (CZ); Michal Sofka, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 811 days.

(21) Appl. No.: 15/143,792

(22) Filed: May 2, 2016

(65) Prior Publication Data
US 2017/0316342 A1 Nov. 2, 2017

(51) Int. Cl.
| | | |
|---|---|---|
| *G06N 20/00* | (2019.01) | |
| *G06N 20/10* | (2019.01) | |
| *G06F 17/11* | (2006.01) | |
| *G06F 21/55* | (2013.01) | |
| *H04L 29/06* | (2006.01) | |

(52) U.S. Cl.
CPC .............. *G06N 20/00* (2019.01); *G06F 17/11* (2013.01); *G06N 20/10* (2019.01); *H04L 63/1425* (2013.01); *G06F 21/552* (2013.01)

(58) Field of Classification Search
CPC ............................ G06N 20/00; G06N 20/10
See application file for complete search history.

(56) References Cited

U.S. PATENT DOCUMENTS

| | | | |
|---|---|---|---|
| 2012/0185814 A1* | 7/2012 | Nitta | G06F 17/5009 716/112 |
| 2014/0237595 A1* | 8/2014 | Sridhara | H04L 63/1408 726/23 |

OTHER PUBLICATIONS

Bosch, Anna, Andrew Zisserman, and Xavier Munoz. "Representing shape with a spatial pyramid kernel." Proceedings of the 6th ACM international conference on Image and video retrieval. ACM, 2007. (Year: 2007).*
Sengee, Nyamlkhagva, and Heung Kook Choi. "Brightness preserving weight clustering histogram equalization." IEEE Transactions on Consumer Electronics 54.3 (2008). (Year: 2008).*
Kind, Andreas, Marc Ph Stoecklin, and Xenofontas Dimitropoulos. "Histogram-based traffic anomaly detection." IEEE Transactions on Network and Service Management 6.2 (2009): 110-121. (Year: 2009).*
European Search Report dated Aug. 10, 2017 in connection with European Application No. 17 16 8026.
(Continued)

*Primary Examiner* — Eric Nilsson
(74) *Attorney, Agent, or Firm* — Behmke Innovation Group LLC; James Behmke; Stephen D. LeBarron

(57) ABSTRACT

In one embodiment, a learning machine device initializes thresholds of a data representation of one or more data features, the thresholds specifying a first number of pre-defined bins (e.g., uniform and equidistant bins). Next, adjacent bins of the pre-defined bins having substantially similar weights may be reciprocally merged, the merging resulting in a second number of refined bins that is less than the first number. Notably, while merging, the device also learns weights of a linear decision rule associated with the one or more data features. Accordingly, a data-driven representation for a data-driven classifier may be established based on the refined bins and learned weights.

20 Claims, 23 Drawing Sheets

LEARNING OF CLASSIFIER AND REPRESENTATION

(56) References Cited

OTHER PUBLICATIONS

Vojtech Franc et al: "Learning data discretization via convex optimization," Center for Machine Perception Czech Technical University in Prague, Jan. 28, 2016, pp. 2, 9-pp. 10, 12, retrieved from the Internet: http://cmp.felk.cvut.cz/ftp/articles/franc/Franc-TR-2016-01.pdf.

Vojtech Franc et al.: "Learning data discretization via convex programming," Czech Technical University in Prague, May 24, 2016, pp. 6, 36-p. 40, retrieved from the Internet: http://fcds.cs.put.poznan.pl/Seminaria/Franc-talk-Poznan-2016-05-24.pdf.

Bengio, Y., el. al., "Representation Learning: A Review and New Perspectives", IEEE Transactions on Pattern Analysis & Machine Intelligence, vol. 35, No. 8, pp. 1798-1828, Aug. 2013, doi:10.1109/TPAMI.2013.50.

Pele, O., et al., "The Pairwise Piecewise-Linear Embedding for Efficient Non-Linear Classification", Proceedings of the 30th International Conference on Machine Learning (ICML), JMLR: W&CP vol. 28, Jun. 2013, pp. 205-213, Atlanta, Georgia.

\* cited by examiner

US 10,504,038 B2

REFINED LEARNING DATA REPRESENTATION FOR CLASSIFIERS

TECHNICAL FIELD

The present disclosure relates generally to machine learning techniques, and, more particularly, to a refined learning data representation for classifiers.

BACKGROUND

Computer networks are infected by malware, and as the variability of malware samples has been rapidly increasing over the last years, existing signature-based security devices, firewalls, or anti-virus solutions provide only partial protection against these threats. The ability to detect new variants and modifications of existing malware is becoming very important. Machine learning is beginning to be successfully applied to complement signature-based devices.

In statistical machine learning, real-valued features extracted from data are used to construct representations that enable training data-driven classifiers. For example, when classifying network traffic, the features can be extracted from individual connections (flows) or from groups of flows as determined by communication of a user to a domain in a predefined time window. Data-driven classifiers are traditionally based on a manually predefined representation (i.e., feature vectors representing legitimate and malicious communication). Since the accuracy of the classifiers directly depends on the feature vectors, manually predefining the representation is not optimal.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a learning machine device initializes thresholds of a data representation of one or more data features, the thresholds specifying a first number of pre-defined bins (e.g., uniform and equidistant bins). Next, adjacent bins of the pre-defined bins having substantially similar weights may be reciprocally merged, the merging resulting in a second number of refined bins that is less than the first number. Notably, while merging, the device also learns weights of a linear decision rule associated with the one or more data features. Accordingly, a data-driven representation for a data-driven classifier may be established based on the refined bins and learned weights.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links.

Figure 1A:
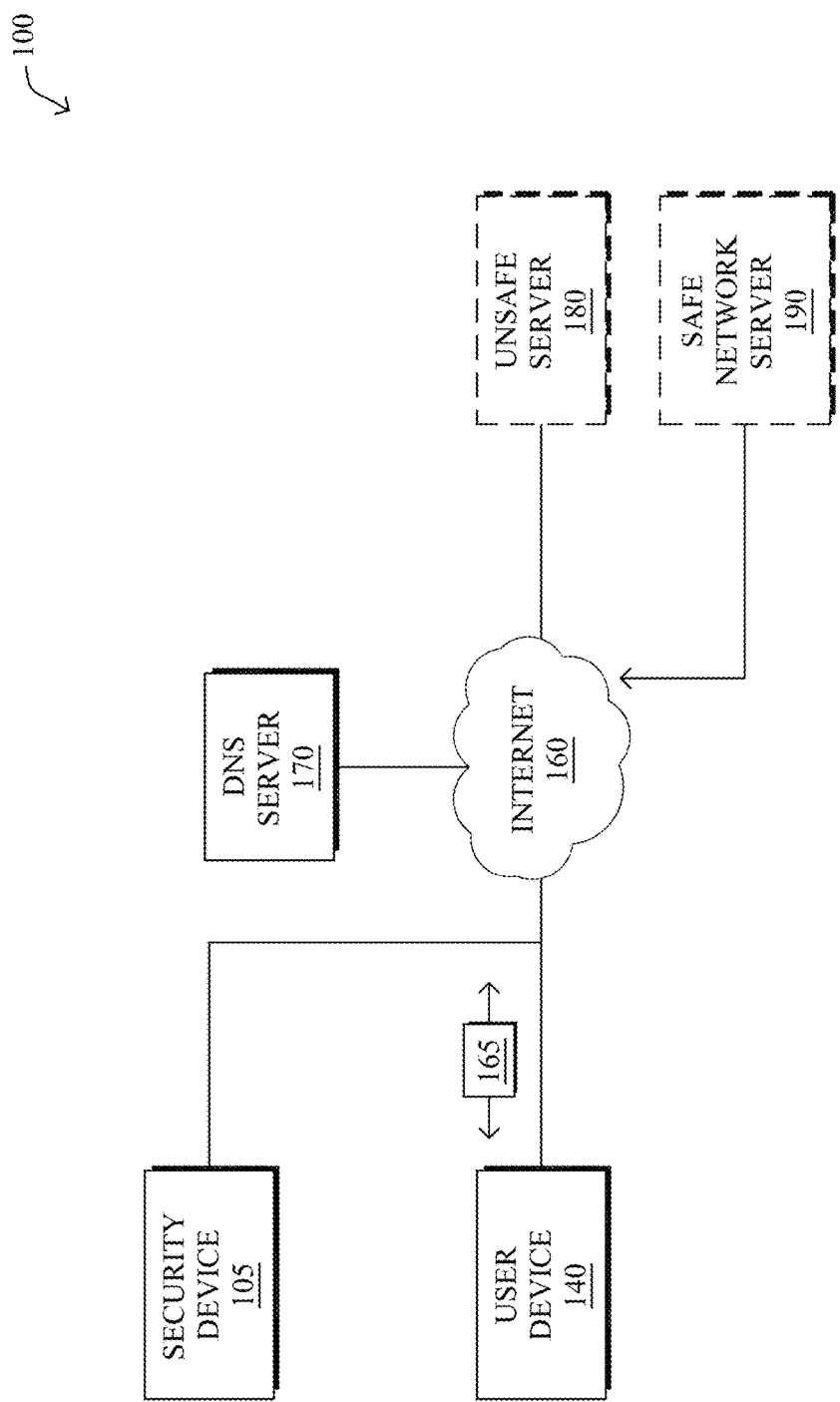
FIG. 1A illustrates an example computer network.

FIG. 1A is a simplified block diagram of an example computer network 100, showing a security device 105 interconnected via a computer network (e.g., Internet) 160 to a variety of devices. In particular, one or more user devices 140 may be connected to the network 160 (e.g., directly or via a proxy). Further, one or more servers may also be connected to the network 160, such as an unsafe server 180, a safe server 190, and other servers, such as domain name servers (DNS) 170. Data packets 165 (e.g., traffic and/or messages sent between the devices) may be exchanged among the devices of the computer network 100 using predefined network communication protocols. In this context, a protocol consists of a set of rules defining how the nodes interact with each other. Those skilled in the art will understand that any number of devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
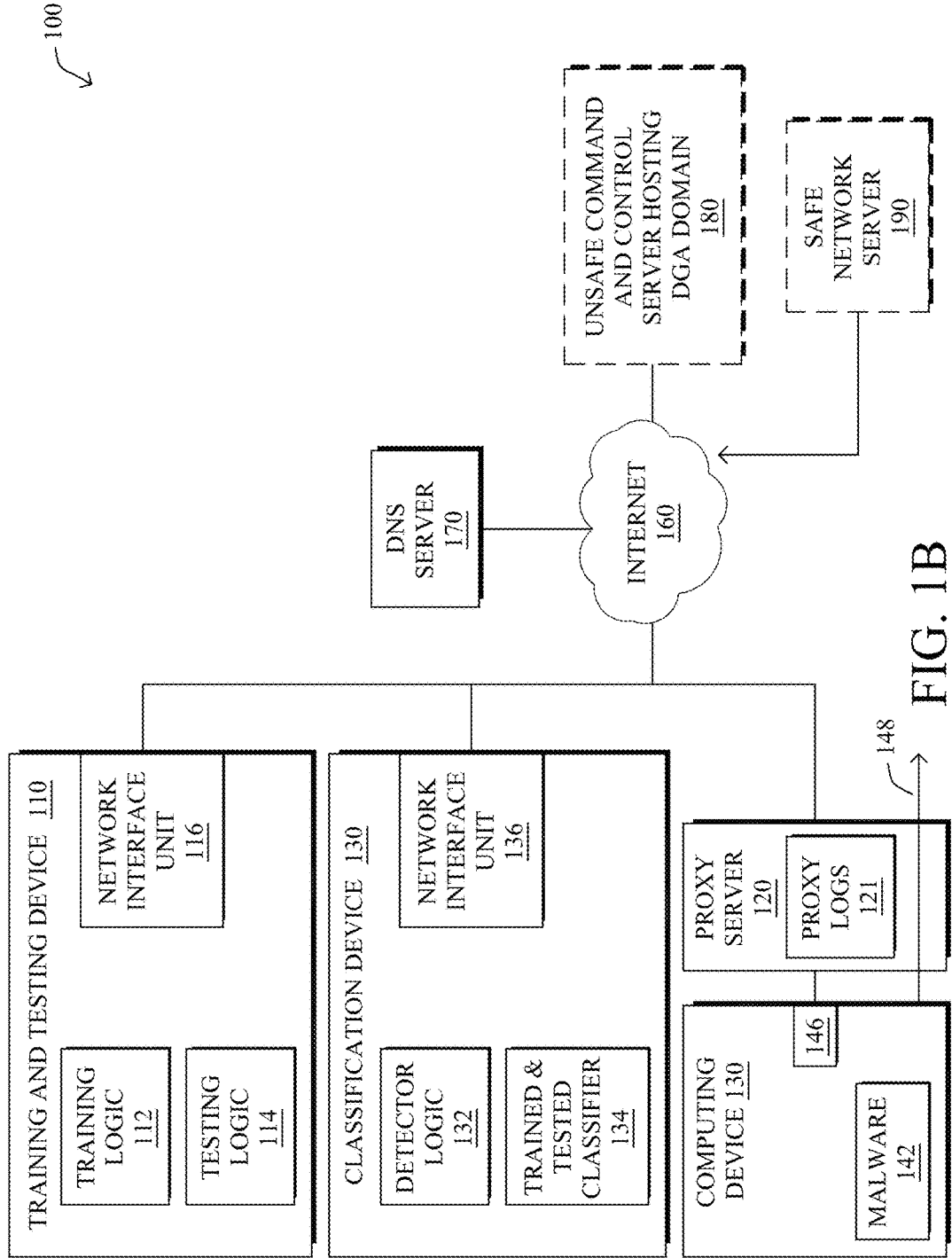
FIG. 1B illustrates an example alternative view of the computer network.

In addition, FIG. 1B is a schematic block diagram of an alternative view of the example computer network (networking system) 100, in which the techniques presented herein may be employed. In particular, in one embodiment, networking system 100 may illustrate the security device 105 as a separate training and testing device 110 and a classification device 130. Training logic 112 and testing logic 114 reside and are executed on the training and testing device. Training and testing device 110 may be connected to proxy server 120 via network interface unit 116 (e.g., a network interface card). FIG. 1B further shows the classification device 130 on which detector logic 132 resides and is executed utilizing trained and tested classifier 134. Classification device 130 may also be connected to proxy server 120 via network interface unit 136. The proxy server 120 stores proxy logs 121 of network communications to Internet 160 that are established via proxy server 120. Networking system 100 also includes computing device 140 on which malware 142 resides and is executed. Computing device 140 is connected to proxy server 120 via network interface unit 146. Proxy Server 120 connects computing device 140 to Internet 160. In FIG. 1B, for simplicity, only computing device 140 is connected to Internet 160 via proxy server 120. However, computing device 140 may be, for example, part of an enterprise network (not shown), and the enterprise network may include, but is not limited to, a plurality of computing devices, servers and other network devices that may be infected by malware. In addition, several network elements may be connected to Internet 160 such as DNS server 170, unsafe Command & Control (C&C) server 180 (e.g., optionally hosting a Domain Generation Algorithm (DGA)) and a safe network server 190 that may host one or more safe domains. In addition, detector logic 132 together with trained and tested classifier 134 may also reside on computing device 140 (e.g., as a security process on device 140).

Notably, FIG. 1B shows an attempt of computing device 140 to establish network communication 148 that is triggered by malware 142. Network connection 148 initiated by computing device 140 may be an attempt by malware 142 to communicate with unsafe C&C server 180. As used herein, malware 142 refers to an executable file that causes a computer/processor to execute instructions, and the malware may be in a machine language, interpreted language, intermediate language, script language or any other language now known or hereinafter developed that causes a computer/processor to execute instructions.

Figure 2:
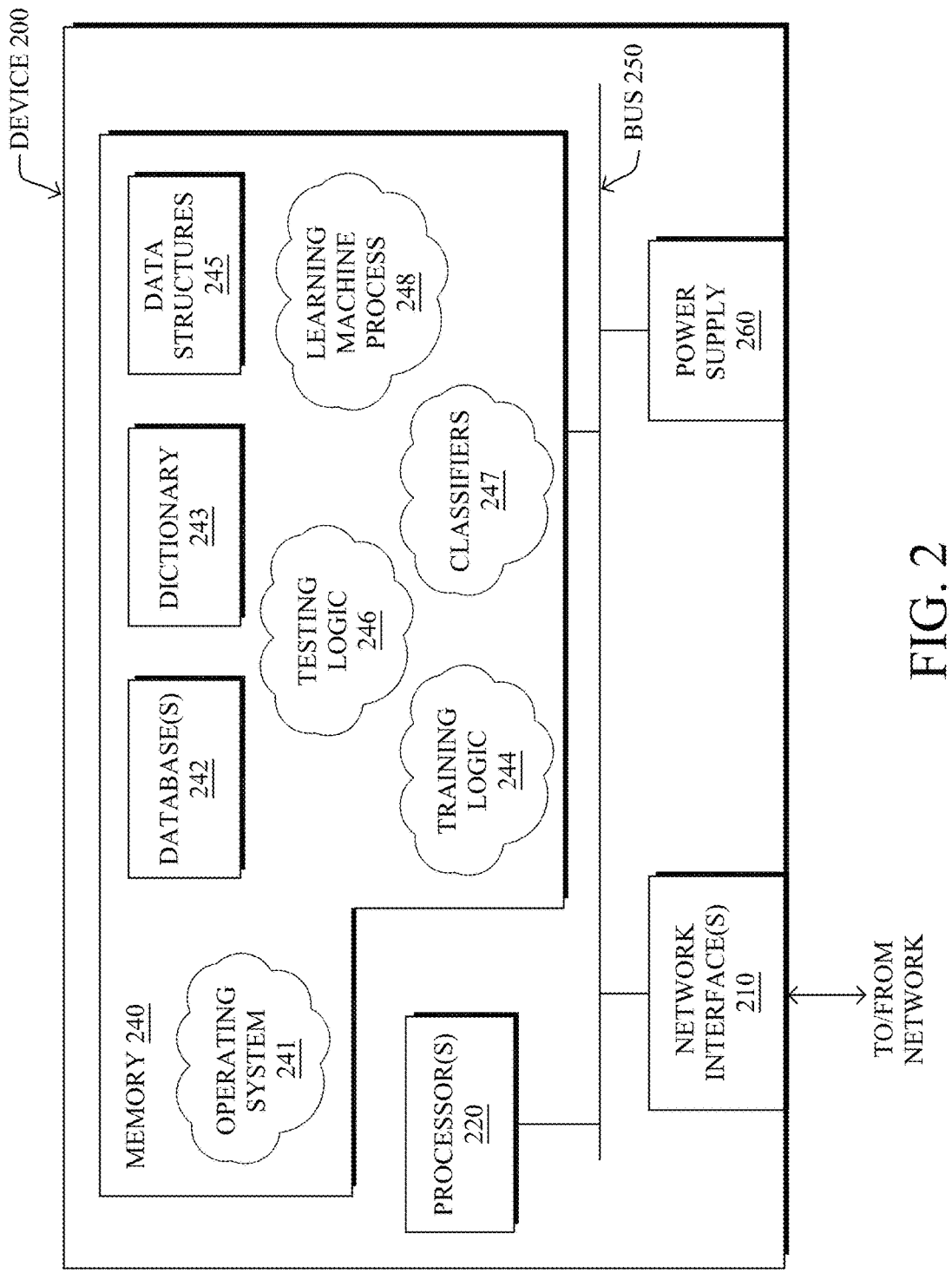
FIG. 2 illustrates an example computing device.

FIG. 2 is a schematic block diagram of an example device 200 that may be used with one or more embodiments described herein, e.g., as the security device 105 (or as training and testing device 110 and/or classification device 130) of FIGS. 1A-1B above. The device may comprise one or more network interfaces 210, at least one processor 220, and a memory 240 interconnected by a system bus 250, as well as a power supply 260.

The network interface(s) 210 contain the mechanical, electrical, and signaling circuitry for communicating data over links coupled to the network 100. The network interfaces may be configured to transmit and/or receive data using a variety of different communication protocols. The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a "learning machine" process 248, as described herein, which may coordinate with various databases 242, dictionary(ies) 243, training logic 244, testing logic 246, and classifiers 247.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, computer networks are infected by malware, and as the variability of malware samples has been rapidly increasing over the last years, existing signature-based security systems, firewalls, or anti-virus solutions provide only partial protection against these threats. The ability to detect new variants and modifications of existing malware is becoming very important. Machine learning is beginning to be successfully applied to complement signature-based systems.

Learning machine process 248, in particular, may include computer executable instructions that, when executed by processor(s) 220, cause device 200 to perform anomaly detection functions as part of an anomaly detection infrastructure within a computer network. (Notably, the techniques herein are not limited to computer networks, and the use of a learning machine process within a computer network is merely one representative use-case example.) In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used. Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a machine-learning-enabled node having computed behavioral model(s) may raise an anomaly when detecting a brutal behavior change. Note that in such as case, although an anomaly may be raised, a learning system such as machine learning (particularly, a self-learning network) is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic black-hole, QoS degradation, etc. Such misconfiguration may be advantageously identified by learning machine process 248, in order to be detected and fixed.

In various embodiments, machine learning process 248 may utilize machine learning techniques to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Notably, an example self learning network (SLN) infrastructure that may be used to detect network anomalies may have a network of devices that are configured to operate as part of an SLN infrastructure to detect, analyze, and/or mitigate network anomalies such as network attacks (e.g., by executing a corresponding learning machine process 248). Such an infrastructure may include certain network devices acting as distributed learning agents (DLAs) and one or more supervisory/centralized devices acting as a supervisory learning agent (SLA). A DLA may be operable to monitor network conditions (e.g., router states, traffic flows, etc.), perform anomaly detection on the monitored data using one or more machine learning models, report detected anomalies to the SLA, and/or perform local mitigation actions. Similarly, an SLA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

——Refined Learning Data Representation for Classifiers——

Many current network security devices classify large amounts of the malicious network traffic and report the results in many individually-identified incidents, some of which are false alerts. On the other hand, a lot of malicious traffic remains undetected due to the increasing variability of malware attacks. As a result, security analysts might miss severe complex attacks because the incidents are not correctly prioritized or reported.

The network traffic can be classified at different levels of detail. Approaches based on packet inspection and signature matching rely on a database of known malware samples. These techniques are able to achieve results with high precision (low number of false alerts), but their detection ability is limited only to the known samples and patterns included in the database (limited recall). Moreover, due to the continuous improvements of network bandwidth, analyzing individual packets is becoming intractable on high-speed network links. It is more efficient to classify network traffic based on flows representing groups of packets (e.g., NetFlow or proxy logs). While this approach has typically lower precision, it uses statistical modeling and behavioral analysis to find new and previously unseen malicious threats (higher recall).

Statistical features calculated from flows can be used for unsupervised anomaly detection, or in supervised classification to train data-driven classifiers of malicious traffic. While the former approach is typically used to detect new threats, it suffers from lower precision which limits its practical usefulness due to large amount of false alerts. Data-driven classifiers trained on known malicious samples achieve better efficacy results, but the results are directly dependent on the samples used in the training. Once a malware changes the behavior, the system needs to be retrained. With continuously rising number of malware variants, this becomes a major bottleneck in modern malware detection systems. Therefore, the robustness and invariance of features extracted from raw data plays the key role when classifying new malware.

The problem of changing malware behavior can be formalized by recognizing that a joint distribution of the malware samples (or features) differs for already known training (source) and yet unseen testing (target) data. This can happen as a result of target evolving after the initial classifier or detector has been trained. In supervised learning, this problem is solved by domain adaptation.

As further mentioned above, in statistical machine learning, real-valued features extracted from data are used to construct representations that enable training data-driven classifiers. For example, when classifying network traffic, the features can be extracted from individual flows or from groups of flows as determined by communication of a user to a domain in a predefined time window. Data-driven classifiers are traditionally based on a manually predefined representation (i.e., feature vectors representing legitimate and malicious communication). Since the accuracy of the classifiers directly depends on the feature vectors, manually predefining the representation is not optimal.

The techniques herein, therefore, refine learning data representations for classifiers in order to provide an optimal representation and decision for classifiers, and particularly for network traffic classifiers. In many supervised classification tasks, the feature values obtained from the data are first aggregated into histogram bins uniformly distributed across the feature value ranges. The proposed techniques herein improve the data representation by simultaneously finding the bins in an optimal way while learning a corresponding set of weights to construct a linear classifier (SVM). Said differently, to optimize the parameters of the representation learned from training data, the techniques herein propose combining the process of learning the representation with the process of learning the classifier, such that the resulting representation ensures easier separation of malicious and legitimate communication and at the same time controls the complexity of the classifier. Several other extensions, as described below (e.g., considering pairs of feature values or arbitrary feature groups), enhance the techniques herein, as well.

Notably, the act of learning representations automatically from input data has drawn a lot of attention in other application domains since they have been shown to provide better results than hand-engineered features. In network security, in particular, this brings new challenges and opportunities to fight against resilient and ever-changing malware. Note also, however, that although specific embodiments are described herein, namely the optimal representation and decision for network traffic classifiers, the techniques are equally applicable to non-network-based classifiers for learning machines.

Specifically, according to one or more embodiments of the disclosure as described in detail below, a learning machine device (e.g., device 200) initializes thresholds of a data representation of one or more data features, the thresholds specifying a first number of pre-defined bins (e.g., uniform and equidistant bins). Next, adjacent bins of the pre-defined bins having substantially similar weights may be reciprocally merged, the merging resulting in a second number of refined bins that is less than the first number. Notably, while merging, the device also learns weights of a linear decision rule associated with the one or more data features. Accordingly, a data-driven representation for a data-driven classifier may be established based on the refined bins and learned weights.

Illustratively, the techniques described herein may be performed by hardware, software, and/or firmware, such as in accordance with the "learning machine" process 248, which may contain computer executable instructions executed by the processor 220 to perform functions relating to the techniques described herein, e.g., in conjunction with other suitable modules and/or processes for machine learning (e.g., training, testing, classifying, etc.). For example, the techniques herein may be treated as extensions to conventional learning machine processes, and as such, may be processed by similar components understood in the art that execute those processes, accordingly.

Operationally, classifiers derive their decision function based on features extracted from data. When the classifiers are trained, it is often beneficial to convert the features to a sparse binary representation by defining a set of feature ranges (e.g., histogram bins) and binary variables that indicate in what range (bin) the original feature value falls. In particular, classification performance heavily depends on the number of bins b and their edges θ defining the width of the histogram bins. Incorrectly chosen parameters b and θ leads to suboptimal efficacy results, particularly when manually predefined. To define the parameters optimally, the techniques herein learn these parameters automatically from the training data in such a way to maximize the classification separability between positive and negative samples.

When creating histograms, input instances are vectors which are transformed into a concatenated histogram. To keep the notation simple and concise, the disclosure herein denotes the input instances (input real-valued features, e.g., extracted from flows) simply as:

$$x = (x_1, \ldots, x_n) \in \mathbb{R}^n, \quad \text{Eq. 1}$$

which is a sequence of n vectors each of dimension m.

The original features are converted (binarized) to a sparse representation:

$$\phi: \mathbb{R}^n \to \{0,1\}^{n \cdot b}, \quad \text{Eq. 2}$$

such that $$\phi_{ij}(x; \Theta) = \begin{cases} 1 & \text{if } x_i \in [\theta^i_{j-1}, \theta^i_j) \\ 0 & \text{otherwise} \end{cases}, \quad \text{Eq. 3}$$

where $$\Theta = (\theta_0^1, \ldots, \theta_b^1, \ldots, \theta_0^n, \ldots, \theta_b^n) \in \mathbb{R}^{n \cdot b} \quad \text{Eq. 4}$$

is a set of thresholds.

Said differently, the input instance x is represented via a feature map:

$$\phi: \mathbb{R}^{m \times m} \to \mathbb{R}^{n \cdot b} \quad \text{Eq. 5}$$

defined as a concatenation of the normalized histograms of all vectors in that sequence, that is, $$\theta = \phi(x; \theta) = (\phi(x_1; \theta_1), \ldots, \phi(x_n; \theta_n)), \quad \text{Eq. 6}$$

where $(\theta_1, \ldots, \theta_n)$ denotes bin edges of all normalized histograms stacked to a single vector.

Notably, such binary representation is useful for training linear classifiers such as Support Vector Machines (SVMs) since the transformed feature vectors are in a higher dimensional space, easier separable by a linear decision rule than the original feature vectors. Formally, assume a decision rule is defined as:

$$h: \mathbb{R}^n \to \{+1, -1\} \quad \text{Eq. 7}$$

based on thresholding a linear score $$h(x) = \text{sgn}(f(x; w, \Theta) + w_0) \quad \text{Eq. 8}$$

where $$f(x; w, \Theta) = \sum_{i=1}^{n} \sum_{j=1}^{b} w_{ij} \phi_{ij}(x; \Theta) \quad \text{Eq. 9}$$

In other words, the techniques herein aim at designing a classifier as:

$$h: \mathbb{R}^{m \times m} \times \mathbb{R}^{n+1} \times \mathbb{R}^{n(b+1)} \to \{-1, +1\} \quad \text{Eq. 10}$$

working on top of the histogram representation, that is $$h(x; w, w_0, \theta) = \quad \text{Eq. 11}$$

$$\text{sign}(\langle \phi(x, w) \rangle + w_0) = \text{sign}\left(\sum_{i=1}^{n} \sum_{j=1}^{b} \phi(x_i, \theta_{i,j-1}, \theta_{i,j}) w_{i,j} + w_0\right)$$

The classifier above in Eq. 11 (and alternatively Eq. 9) is linear in the parameters (w;$w_0$) but non-linear in θ and x. The techniques herein illustrate a procedure for how to learn parameters (w;$w_0$) and implicitly also θ via a convex optimization.

Figure 3:
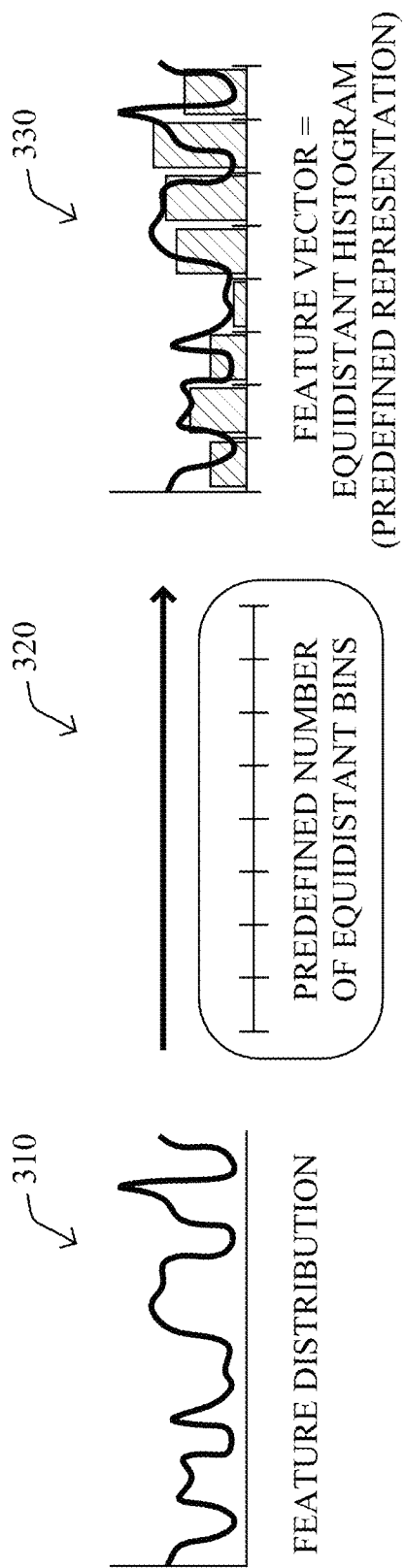
FIG. 3 illustrates an example of using statistical moments or a predefined number of equidistant bins of a histogram to represent feature distributions.

Traditionally, the thresholds are determined by uniformly dividing the range of acceptable feature responses. Although the uniform binning works in most cases, it is clear that such choice is not optimal, as illustrated in FIG. 3. In particular, current systems use either statistical moments (mean and variance) or predefined number of equidistant bins to represent feature distributions. These techniques can inaccurately represent the data which negatively influences the classifier accuracy. Incorrect choice of bins 320 implies that the histogram bars 330 do not match the original feature distribution 310, as illustrated on the right-hand side of the figure.

This techniques herein propose to jointly find the separation of data into bins and an optimal set of weights used in a linear decision rule. In particular, the general concept for constructing an optimal data-driven representation is to initially use a large number of thresholds specifying uniform bins. The bins are then merged in an optimization process that simultaneously learns the weights of a linear decision rule. The weights and the resulting bins therefore yield a linear SVM with optimal binning strategy.

Figure 4:
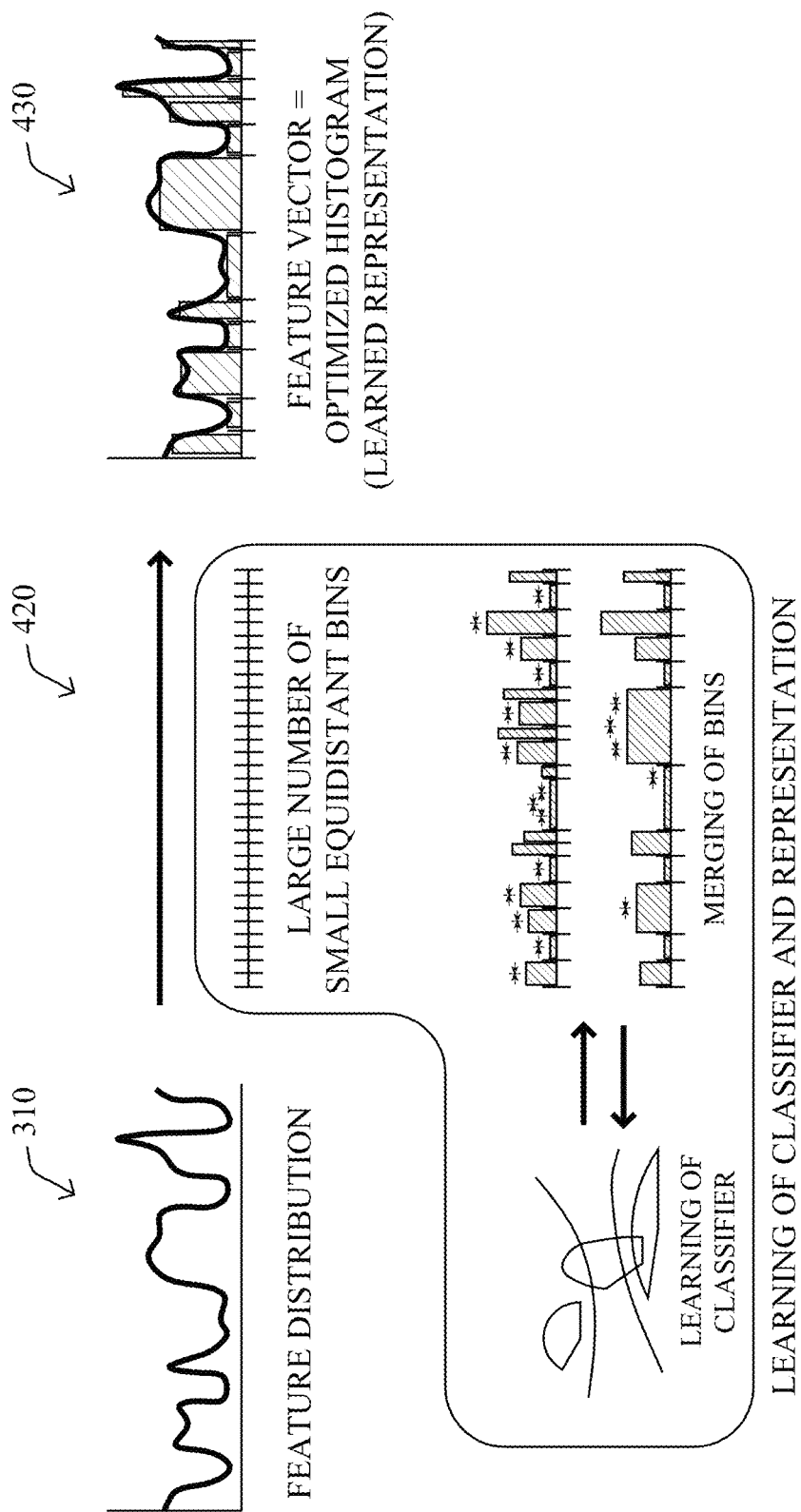
FIG. 4 illustrates an example of refined learning data representation for classifiers, illustrating that there is no need to pre-specify the final number of bins.

For instance, the result of the techniques herein is generally shown in FIG. 4, illustrating that there is no need to pre-specify the final number of bins. That is, as mentioned, and with reference to component 420, the original distribution is first divided into a large number of small initial bins. Then adjacent bins can be merged together when they obtain similar weight as determined by the optimization algorithm (e.g., when weights are equal and adjacent, have a similar value, a similar sign (e.g., "+"=malware, "−"=legitimate traffic)). The resulting representation 430 is data-driven and optimal with regard to the training data and the classifier model.

In particular, the techniques herein construct thresholds Θ uniformly with a high number of bins b and then reduce the bins by merging when possible. Given training examples of:

$$\{(x_1,y_1),\ldots,(x_m,y_m)\}\in(\mathbb{R}^n\times\{-1,+1\})^m, \quad \text{Eq. 12}$$

learning of weights is formulated as a convex problem:

$$\min_{w\in\mathbb{R}^{n\cdot b}}\left[\lambda\|w\|^2 + \gamma\sum_{i=1}^{n}\sum_{j=1}^{b-1}|w_{ij} - w_{i(j+1)}| + \frac{1}{m}\sum_{i=1}^{m}\max\left\{0, 1 - y_i\sum_{i=1}^{n}\sum_{j=1}^{b}w_{ij}\phi_{ij}(x;\Theta)\right\}\right] \quad \text{Eq. 13}$$

where the value of γ (γ>0) implicitly controls the number of bins.

Obtaining the same neighboring weights $w_{ij}=w_{i(j+1)}$ is like merging the bin j and the bin j+1 of the i-th feature to a single bin:

$$[\phi_{j-1}{}^i,\phi_{j+1}{}^i) \quad \text{Eq. 14}$$

Said differently, assume the system herein is given a training set of examples:

$$\{(x^1,y^1),\ldots,(x^m,y^m)\}\in(\mathbb{R}^{n\times m}\times\{+1,-1\})^m. \quad \text{Eq. 15}$$

The techniques herein fix the representation φ such that the number of bins b is sufficiently large and the bin edges θ are equally spaced. We find the weights (w;w₀) by solving:

$$\min_{w\in\mathbb{R}^{b\cdot p},w_0\in\mathbb{R}}\left[\gamma\sum_{i=1}^{n}\sum_{j=1}^{b-1}|w_{i,j} - w_{i,j+1}| + \frac{1}{m}\sum_{i=1}^{m}\max\{0, 1 - y^i\langle\phi(x^i;\theta), w\rangle\}\right] \quad \text{Eq. 16}$$

In this alternative example, the objective is a sum of two convex terms. The second term is the standard hinge-loss surrogate of the training classification error. The first term is a regularization encouraging weights of neighboring bins to be similar. If it happens that the j-th and j+1 bin of the i-th histogram have the same weight, that is, when $w_{i,j}=w_{i,j+1}=w$, then these bins can be effectively merged to a single bin because:

$$w_{i,j}\phi(x_i;\theta_{i,j-1},\theta_{i,j})+w_{i,j+1}\phi(x_i;\theta_{i,j},\theta_{i,j+1})=2w\phi(x_i;\theta_{i,j-1},\theta_{i,j+1}) \quad \text{Eq. 17}$$

The trade-off constant γ>0 can be used to control the number of merged bins. A large value of γ will result in massive merging and consequently in a small number of resulting bins. Hence the objective of the problem in Eq. 16 is to minimize the training error and to simultaneously control the number of resulting bins. The number of bins influences the expressive power of the classifier and thus also the generalization of the classifier. (The optimal setting of λ is found by tuning its value on a validation set.)

Once the problem in Eq. 16 is solved, the techniques herein may thus use the resulting weights w* to construct a new set of bin edges θ* such that the original bins are merged if the neighboring weights have the same sign, i.e., if $w_{i,j}*w_{i,j+1}*>0$. This implies that the new bin edges θ* are a subset of the original bin edges θ, however, their number can be significantly reduced (depending on γ) and they have different widths unlike the original bins. Having the new bins defined, the techniques herein can learn a new set of weights by the standard SVM algorithm:

$$\min_{w\in\mathbb{R}^{\bar{n}},w_0\in\mathbb{R}}\left[\frac{\lambda}{2}\|w\|^2 + \frac{1}{m}\sum_{i=1}^{m}\max\{0, 1 - y^i\langle\phi(x^i; \theta^*), w\rangle\}\right] \quad \text{Eq. 18}$$

Notably, the techniques herein may be extended from considering individual features to using feature pairs. This generalization exploits correlation between feature values when building the representation. In another extension, the techniques herein can be applied to real-valued (non-binarized) features. New feature values on the optimal representation are extracted by averaging subsets of the original features.

Note further that the techniques could also add the quadratic regularizer $$\frac{\lambda}{2}\|w\|^2$$

to the objective of Eq. 16, and learn the weights and the representation in a single stage. However, this would require tuning two regularization parameters (λ and γ) simultaneously, which would be order of magnitude more expensive than tuning them separately in the two stage approach.

Figure 5A:
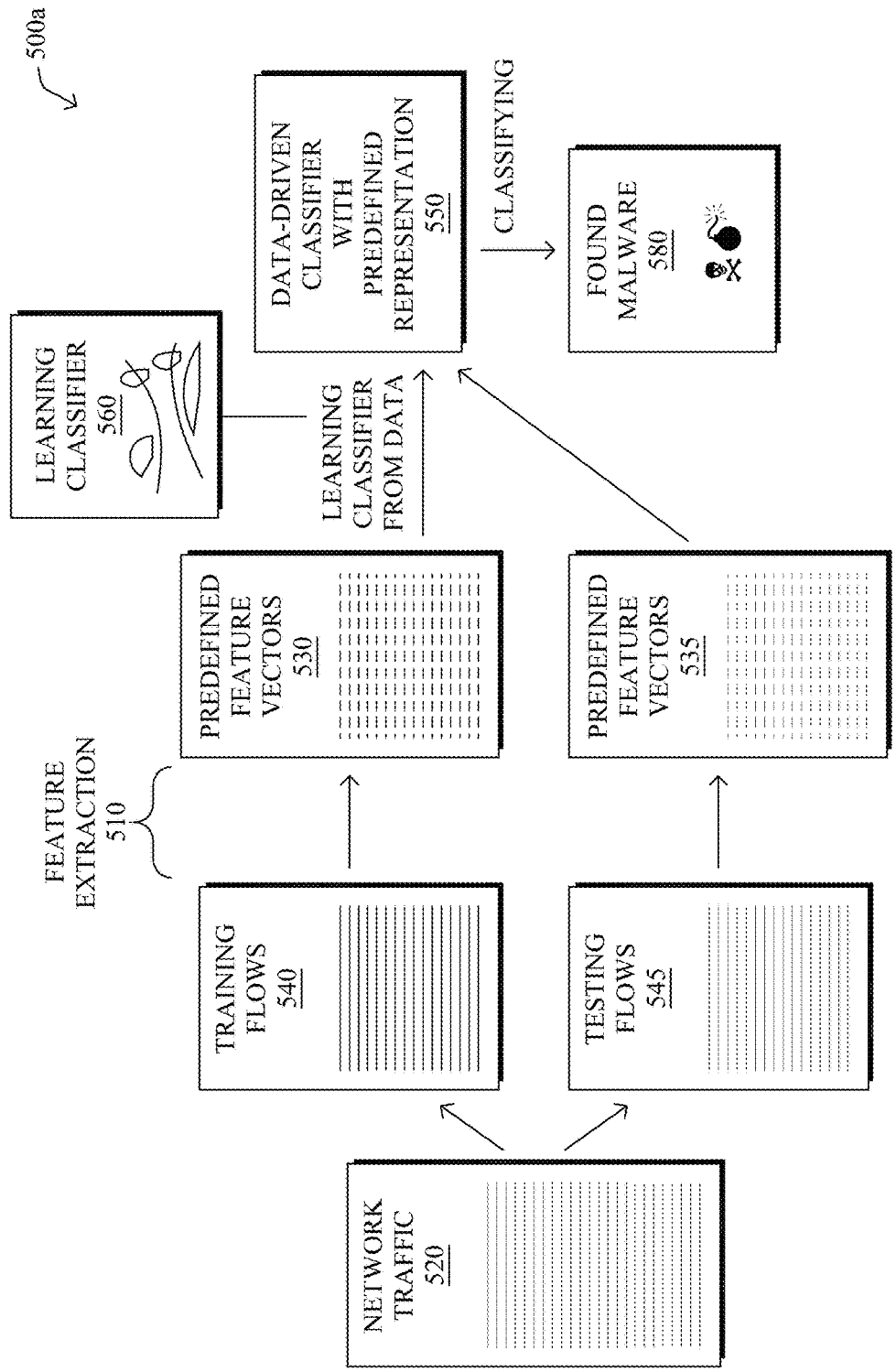
FIGS. 5A-5B illustrate the architecture of a typical system using a data-driven classifier, and the architecture of the proposed full-data-driven classification architecture, respectively.
Figure 5B:
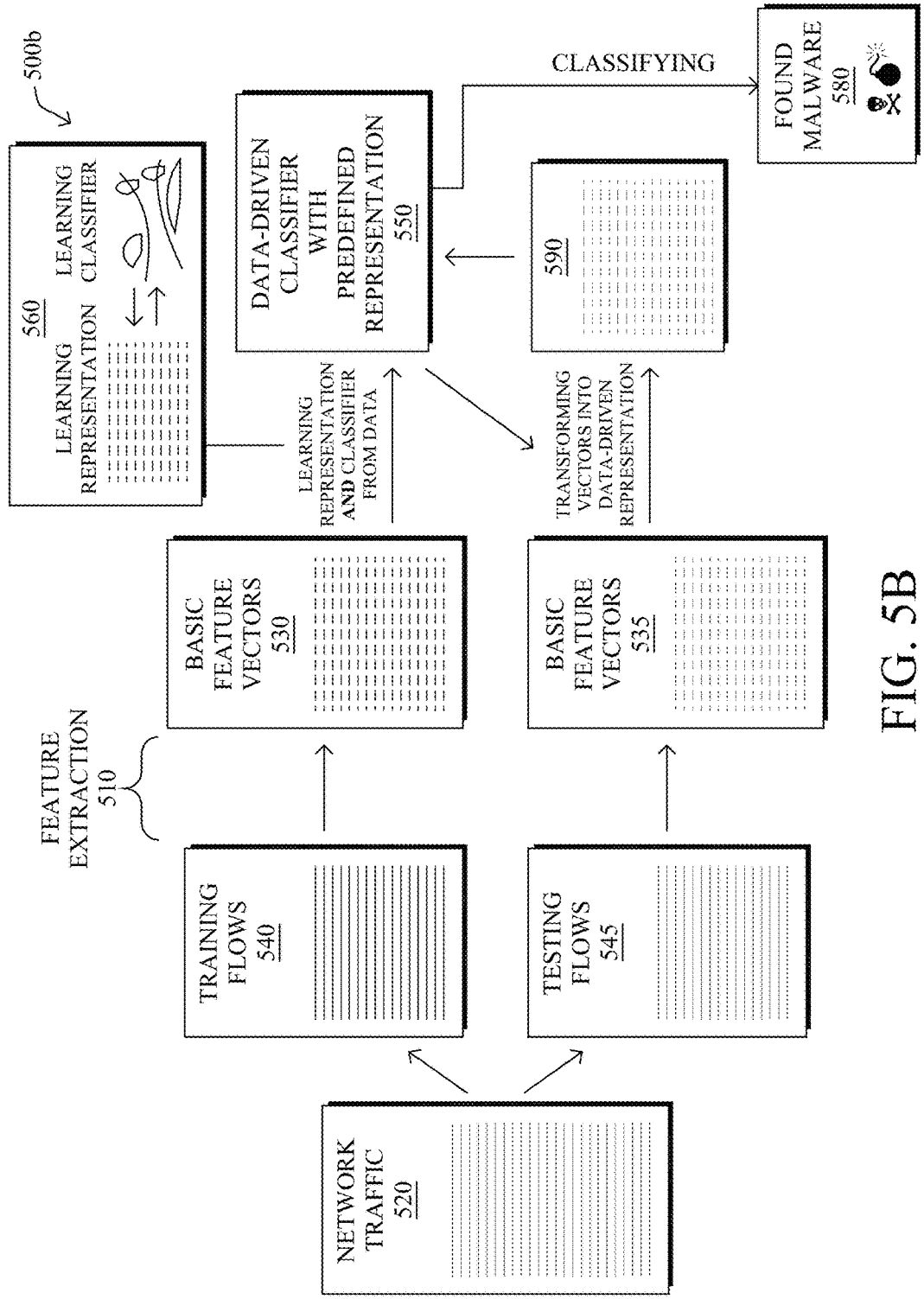
Figure 6A:
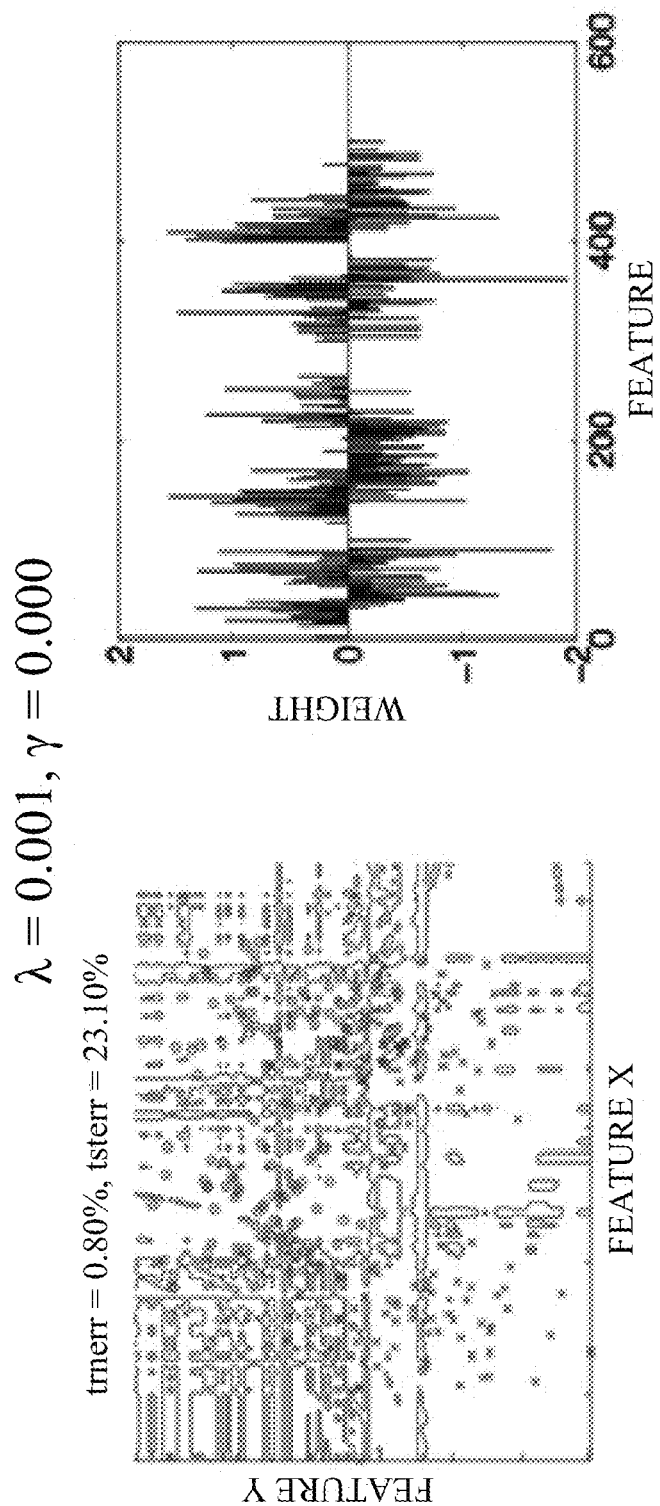
FIGS. 6A-6M illustrate the effect of a $\gamma$ parameter on a resulting representation and a decision boundary of a classifier.
Figure 6B:
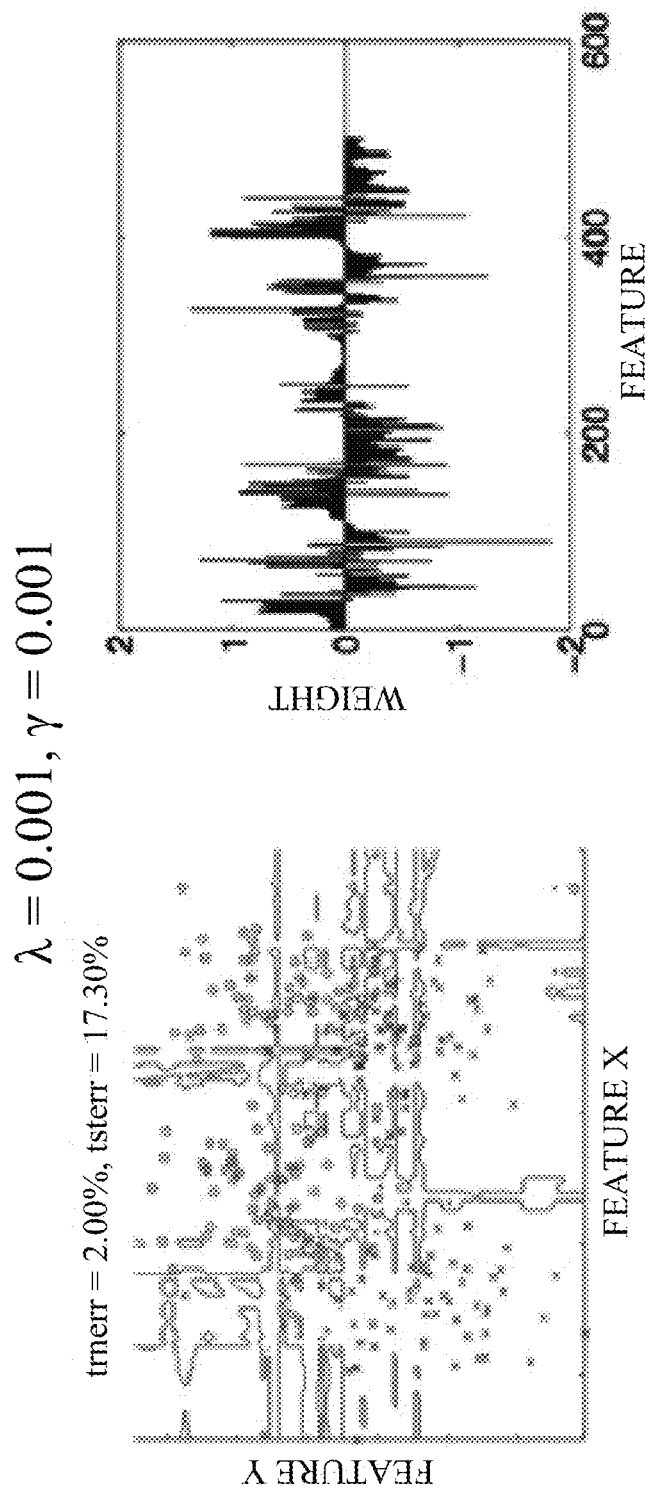
Figure 6C:
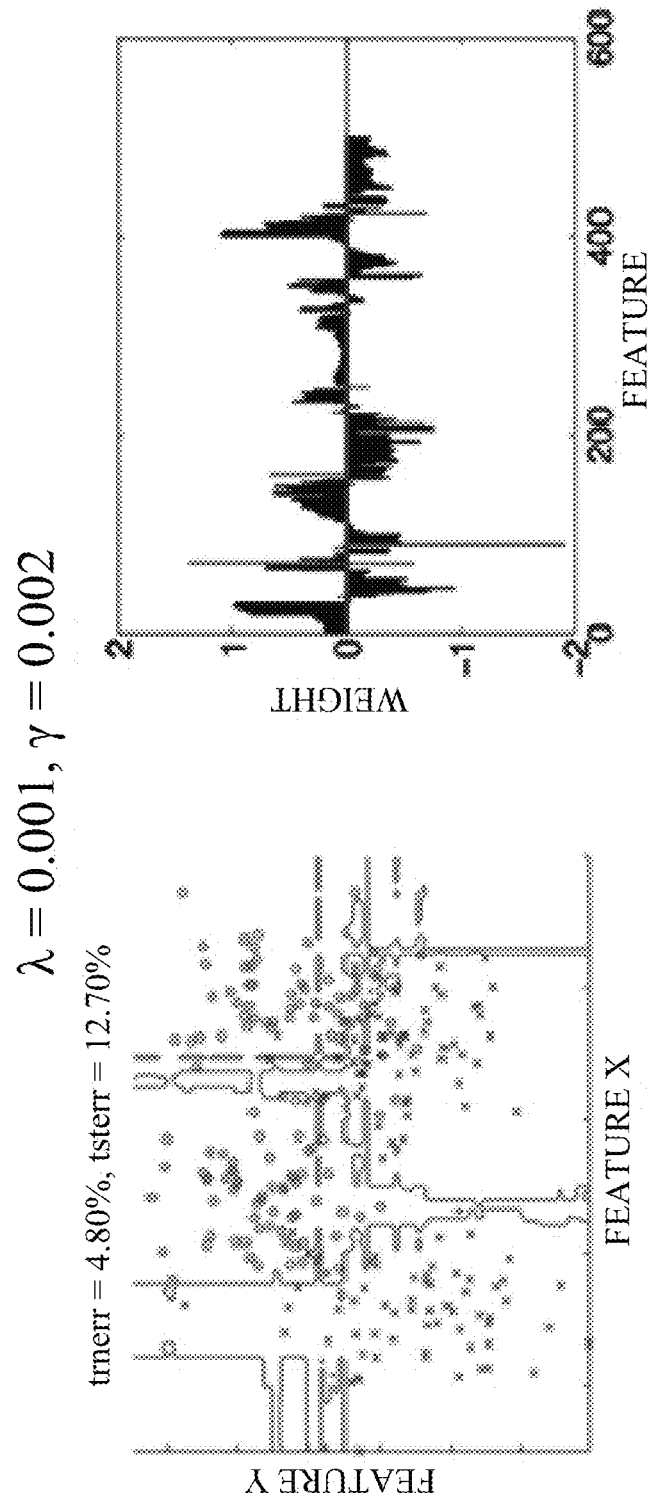
Figure 6D:
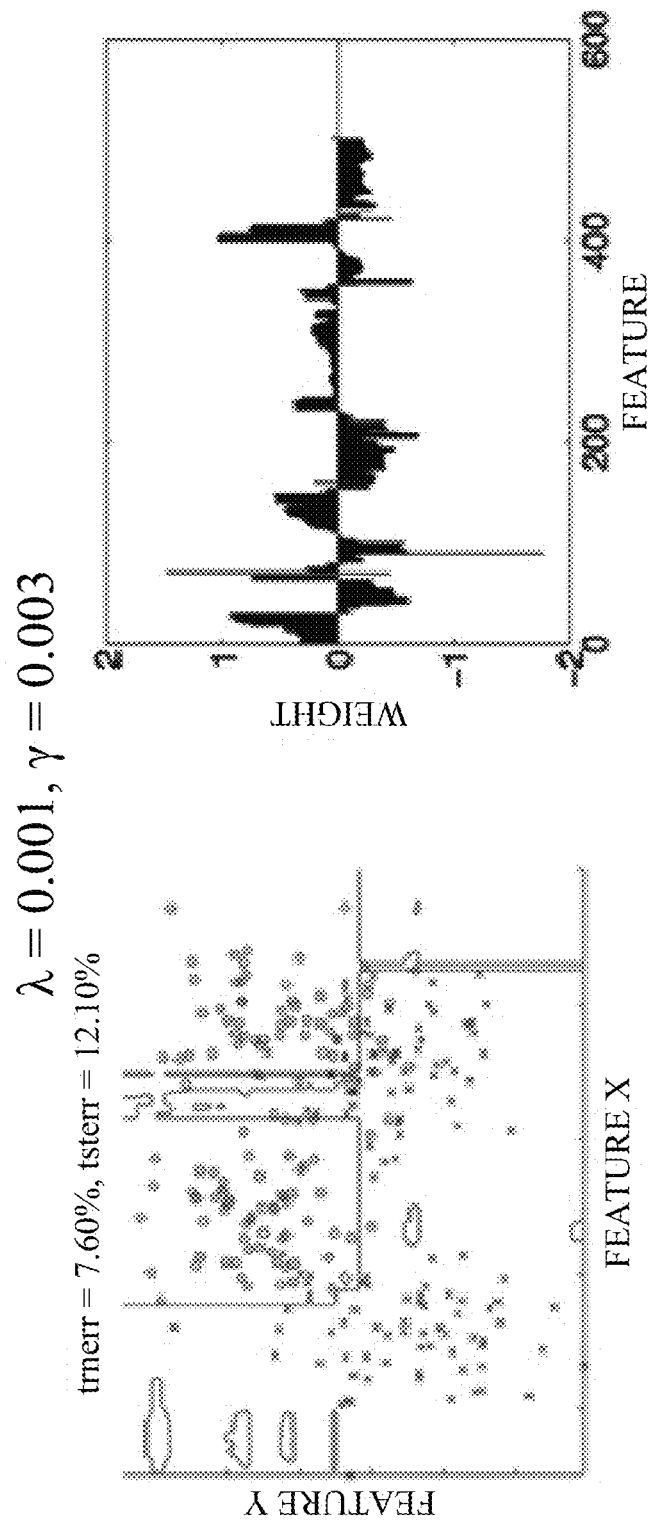
Figure 6E:
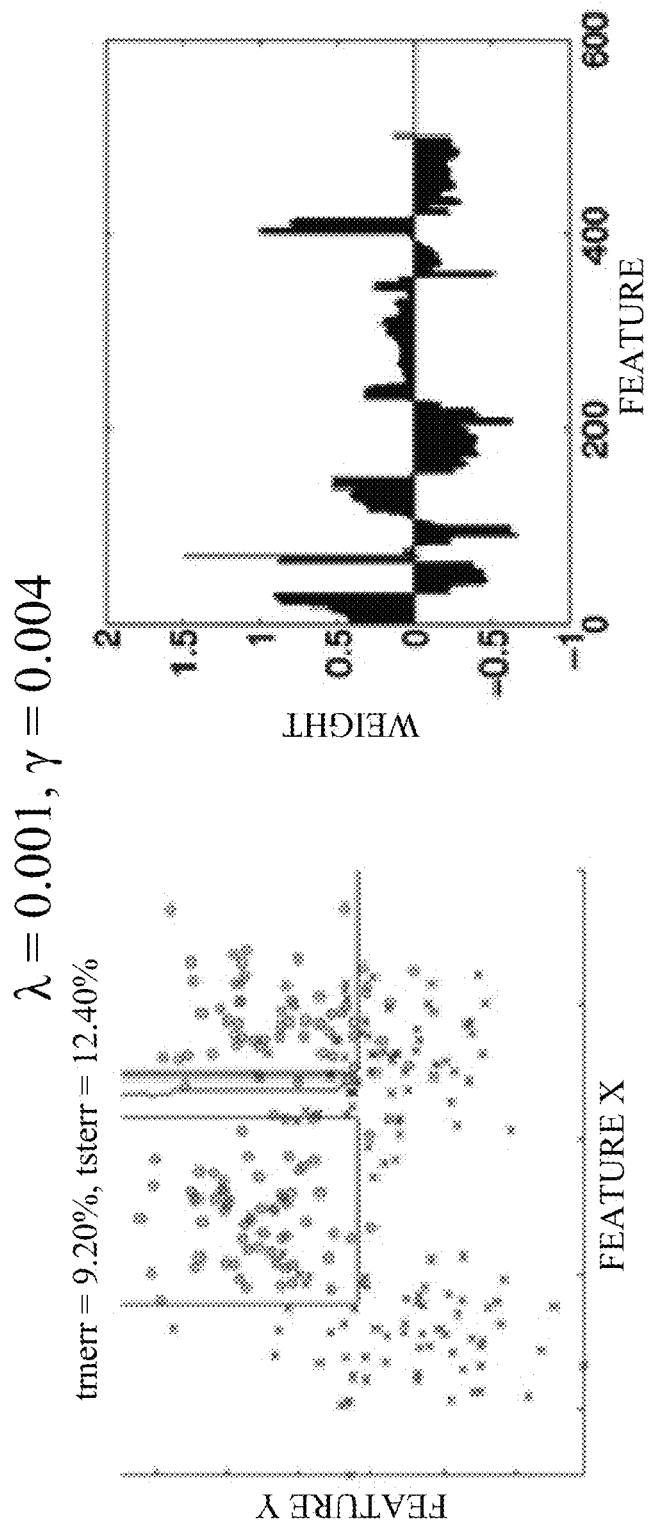
Figure 6F:
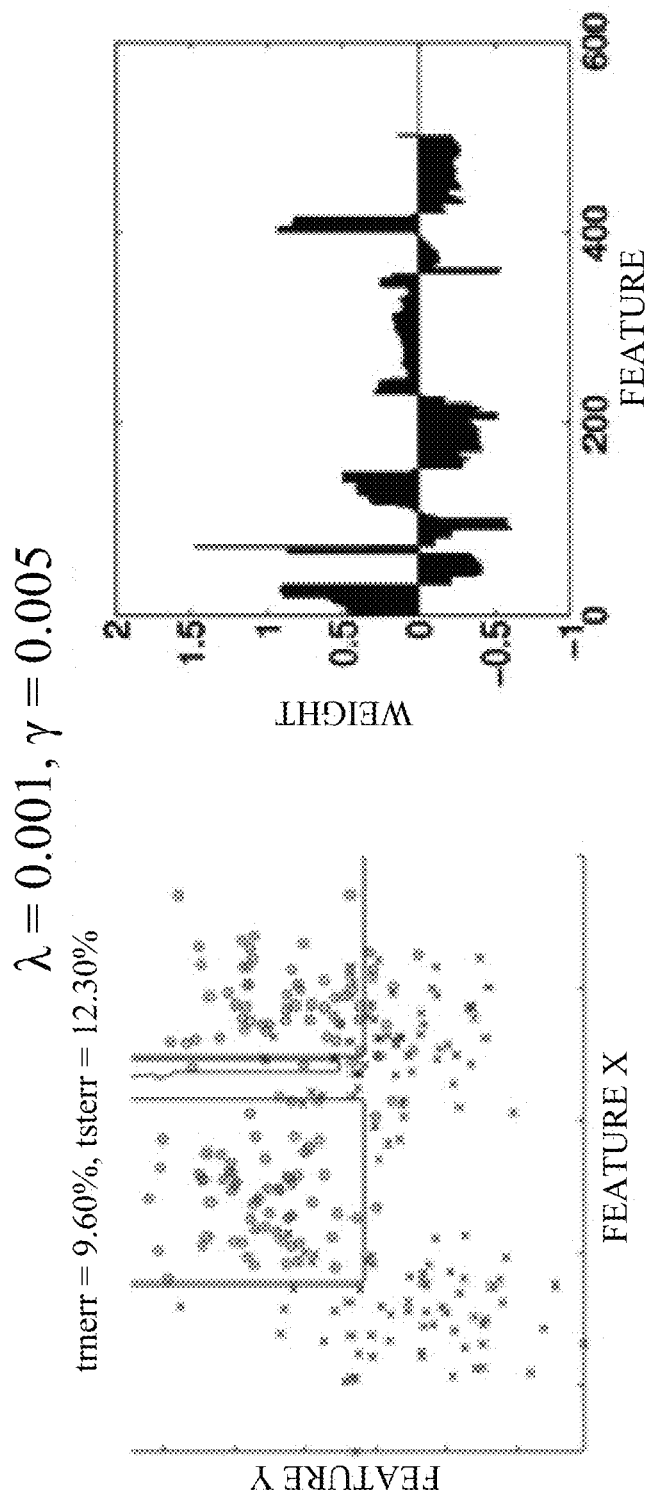
Figure 6G:
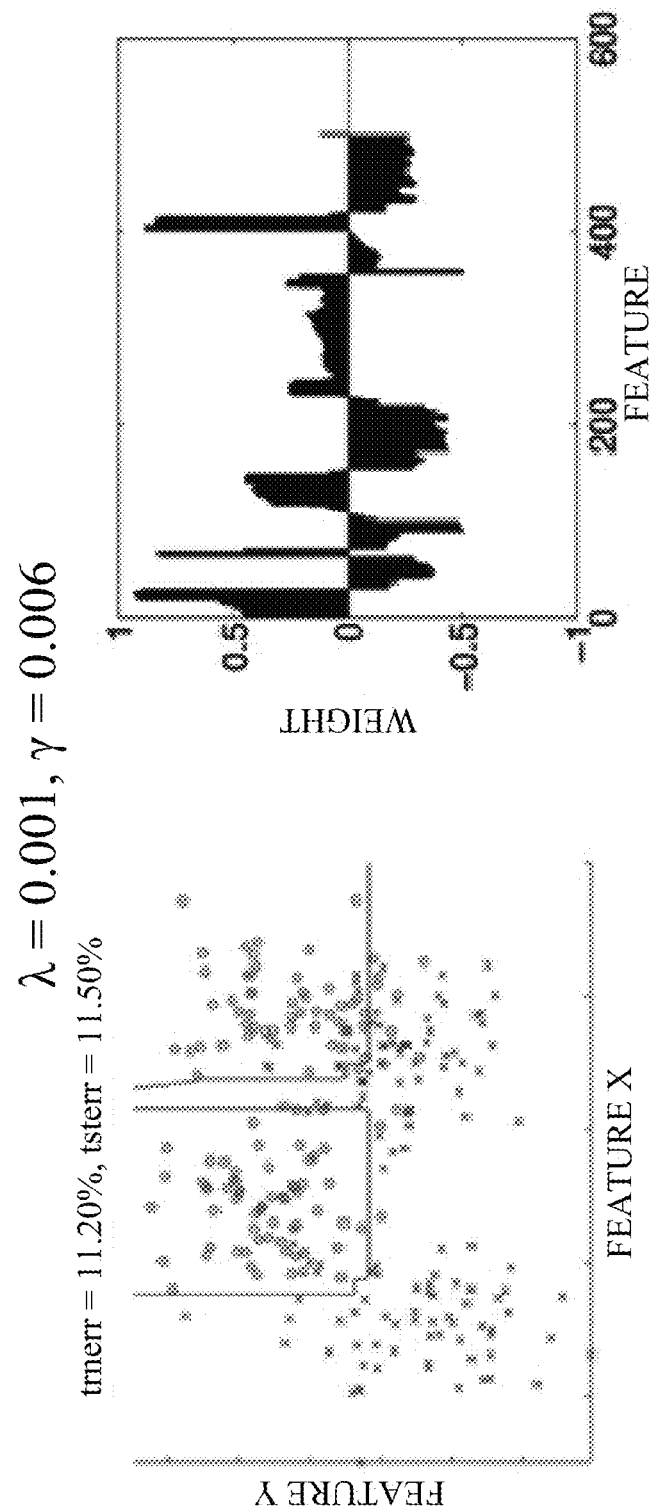
Figure 6H:
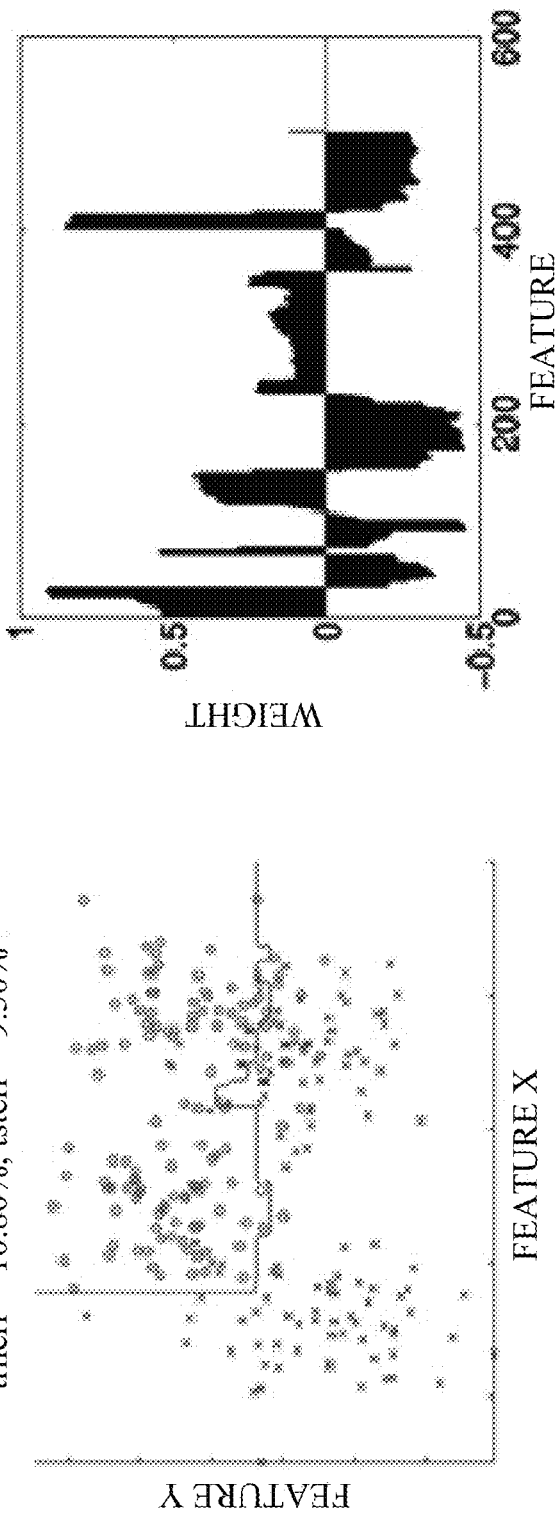
Figure 6I:
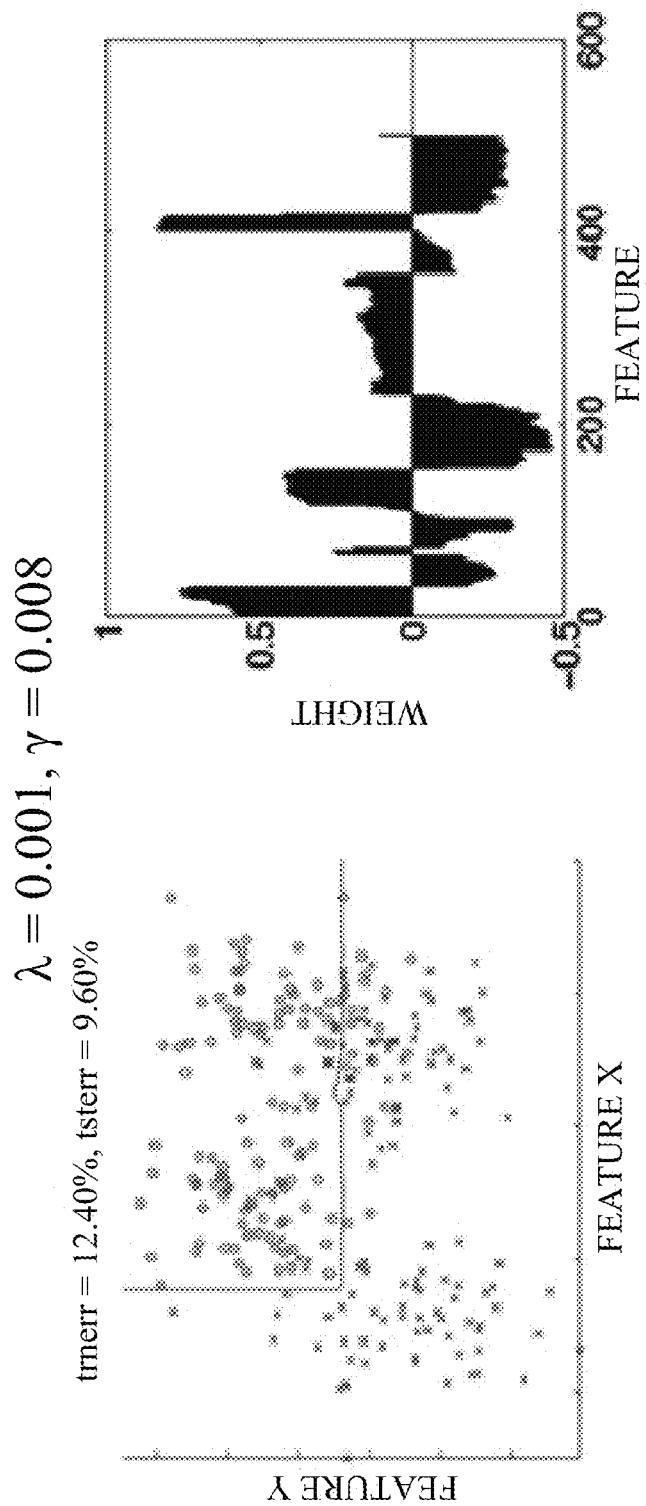
Figure 6J:
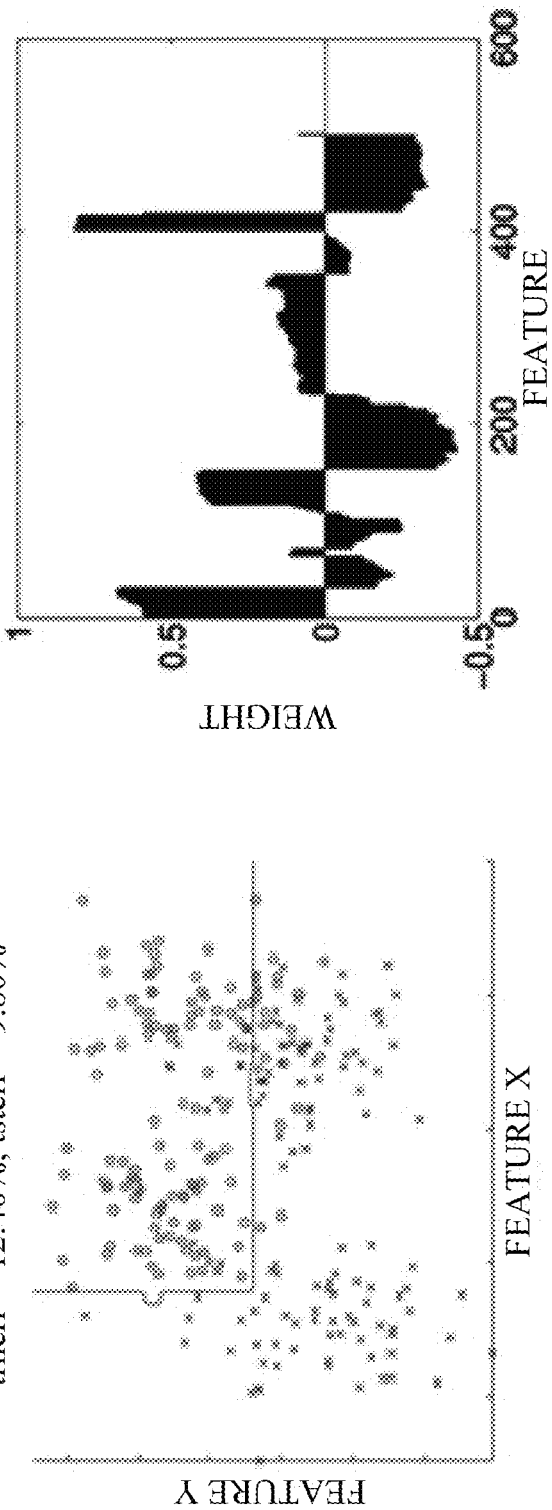
Figure 6K:
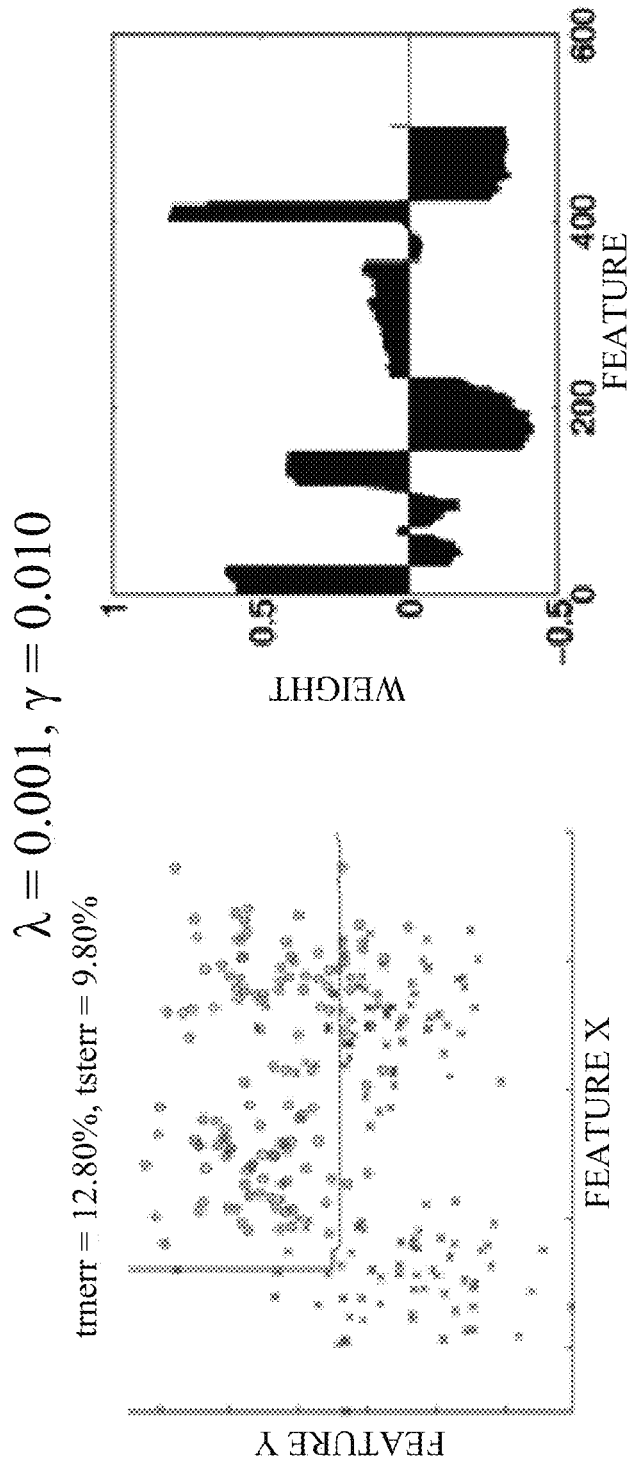
Figure 6L:
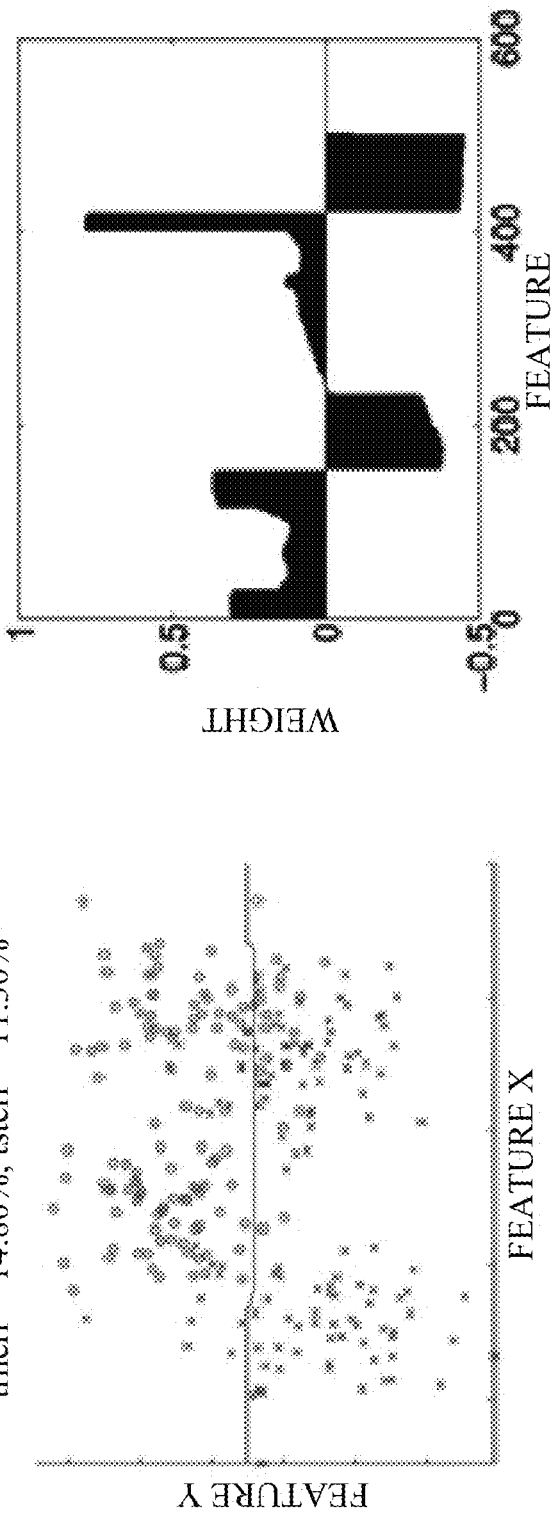
Figure 6M:
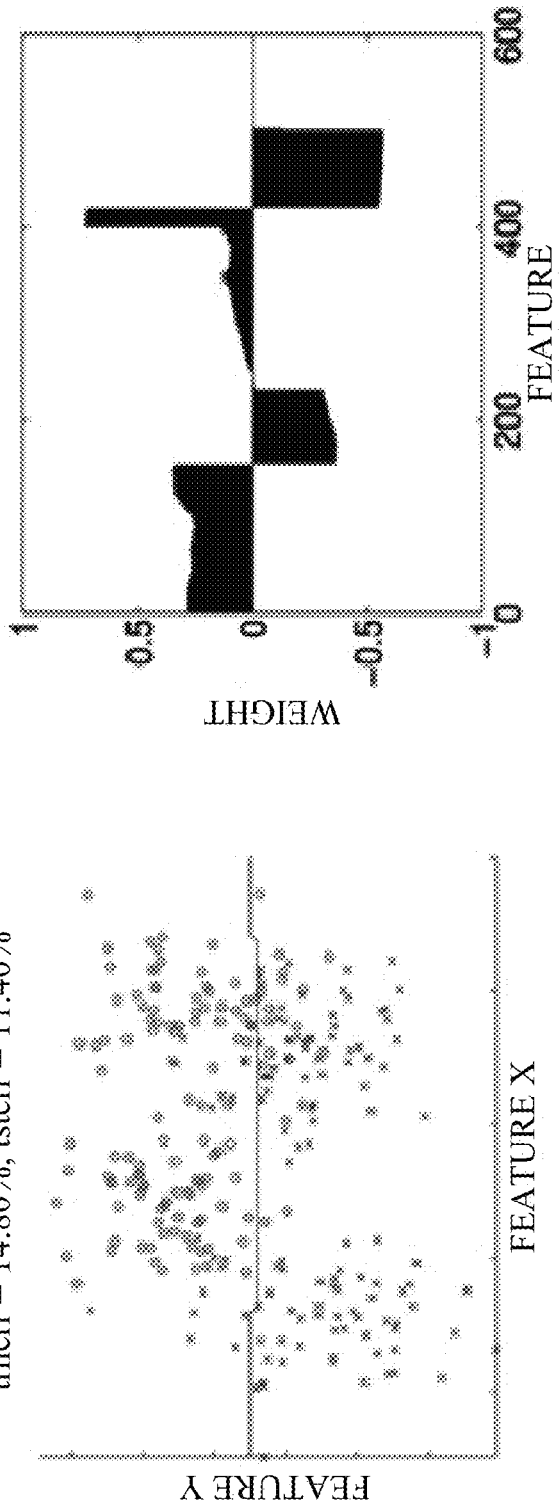

To compare an existing architecture to the proposed architecture defined herein, FIGS. 5A-5B illustrate the architecture of a typical system using a data-driven classifier, and the architecture of the proposed full-data-driven classification architecture, respectively. In particular, in the system 500a as shown in FIG. 5A, the feature extraction 510 transforms the traffic 520 into predefined feature vectors 530 based on training flows 540. During training, a data-driven classifier 550 trains a prediction model 560 from the training feature vectors 530. After deployment, the system classifies the incoming testing vectors 535 (based on testing flows 545) to find malware 580. Even though the classifier is trained from the data automatically, the efficacy is negatively influenced by the fact that the representation was manually predefined. Conversely, in the system 500b in FIG. 5B, using the proposed full-data-driven classification architecture, the parameters of the representation 590 are learned from the training data automatically, which leads to higher efficacy and more detected malware samples.

The following example illustrates an experimental evaluation. In particular, using synthetic data, a two-dimensional (2D) point (x,y) is described by five real-valued features (x, y, $x^2$, $y^2$, xy). Each feature is split to b=100 bins. As the parameter γ changes (indicating the granularity of the representation), the optimization forces the nearby bins to assume similar values. This is seen in FIGS. 6A-6M, where on the right: nearby bins are filled as γ increases. On the left, the optimal decision boundary is shown using the learned weights and the representation. FIGS. 6A-6M thus illustrate the effect of γ parameter on the resulting representation and the decision boundary of the classifier, particularly as γ ranges from 0.000 through various values up to 0.030 (i.e., as γ increases, the bins get smoother, increasing robustness of the classifier).

Figure 7:
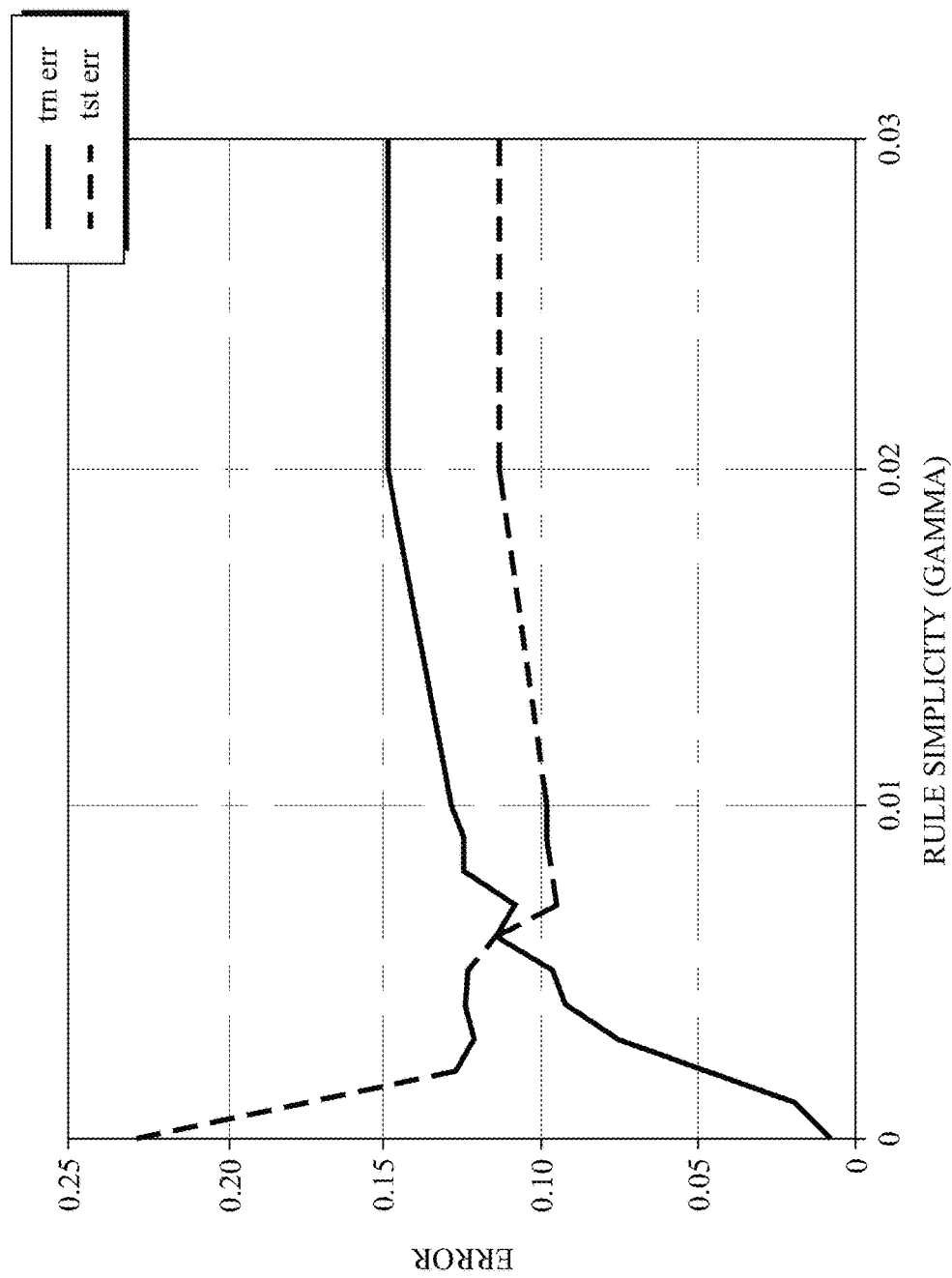
FIG. 7 illustrates the effect of the $\gamma$ parameter on the training and testing error, where higher values of $\gamma$ achieve better generalization.

The parameter γ indicates the expressiveness and complexity of the representation. As such it directly influences the training error [trn err] and testing error [tst err]. With higher values of γ, the representation achieves better generalization (using a simpler representation), as illustrated in FIG. 7. That is, FIG. 7 illustrates the effect of the γ parameter on the training and testing error, where higher values of γ achieve better generalization.

Illustratively, input network traffic data for the evaluation of the techniques herein may be obtained by creating groups of flows (e.g., "bags") consisting of communication from a user to a host in a given time window. The bags may be a representation of samples, that is, instead of classifying flows individually, flows are grouped into bags, where each bag contains flows that are related to each other (e.g., having the same user and target domain). Positive examples were obtained for various categories of malware, where different subsets of malware categories were used for training and testing in order to show that the detector generalizes across different malware families. Several different configurations were tested to highlight the impact of the new technique, e.g., 256 bins down to 8 bins, and then the dynamically created bins (SVM) as defined herein.

Figure 8:
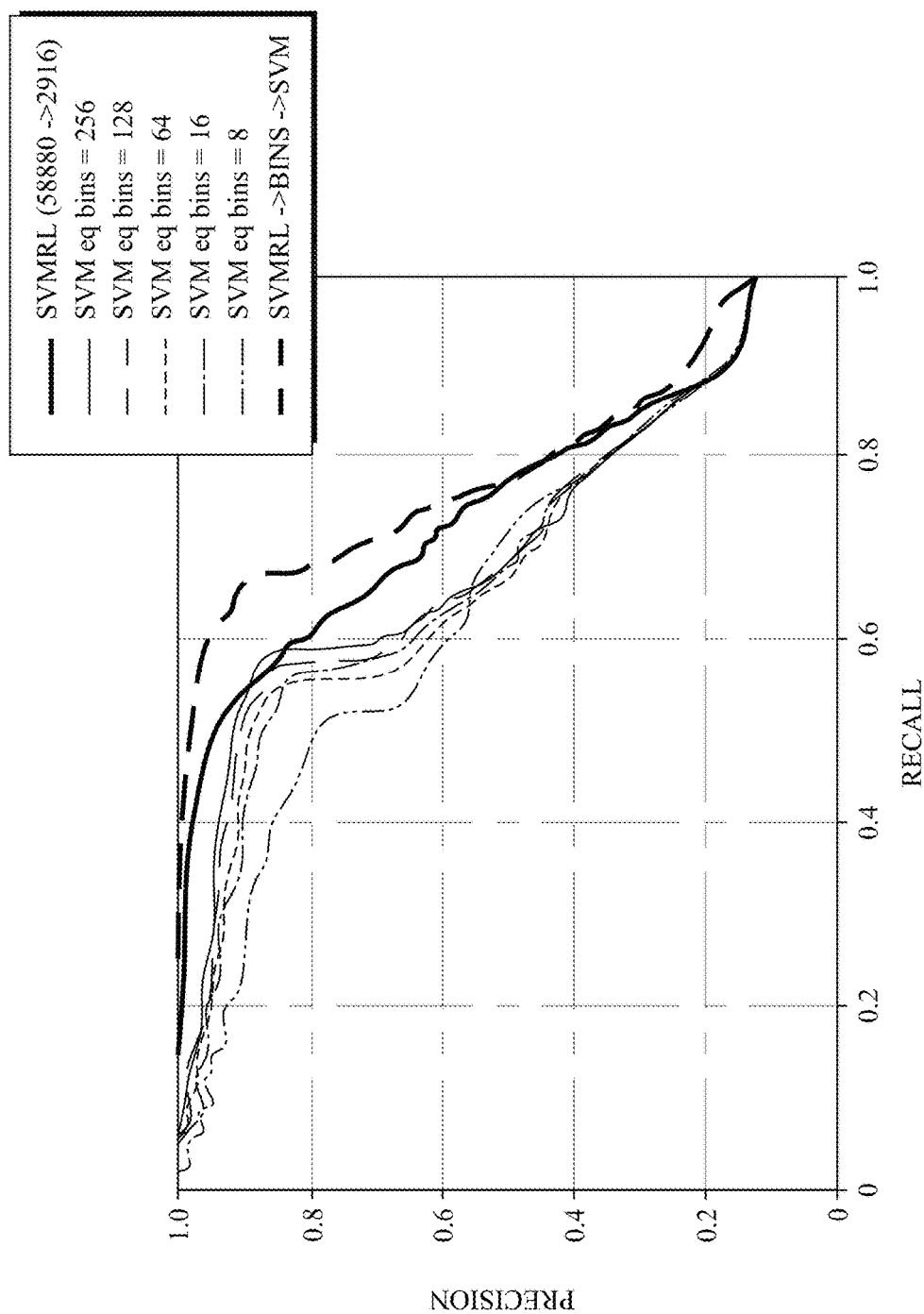
FIG. 8 illustrates an example precision-recall curve to compare the efficacy results of classifiers based on a pre-defined number of bins per feature and based on the refined learning data representation for classifiers in accordance with one or more embodiments described herein.

The precision-recall curve is depicted in FIG. 8 to compare the efficacy results of classifiers based on the proposed representation with predefined number of bins per feature (e.g., 8, 16, 64, 128, and 256 bins) with the same representation, but when the parameters are learned from the training data (using bin optimization described above). Most importantly, when the parameters of the representation are trained to maximize the separability between malicious and legitimate samples, the resulting classifier performs in order of a magnitude better than a classifier with manually predefined parameters.

Figure 9:
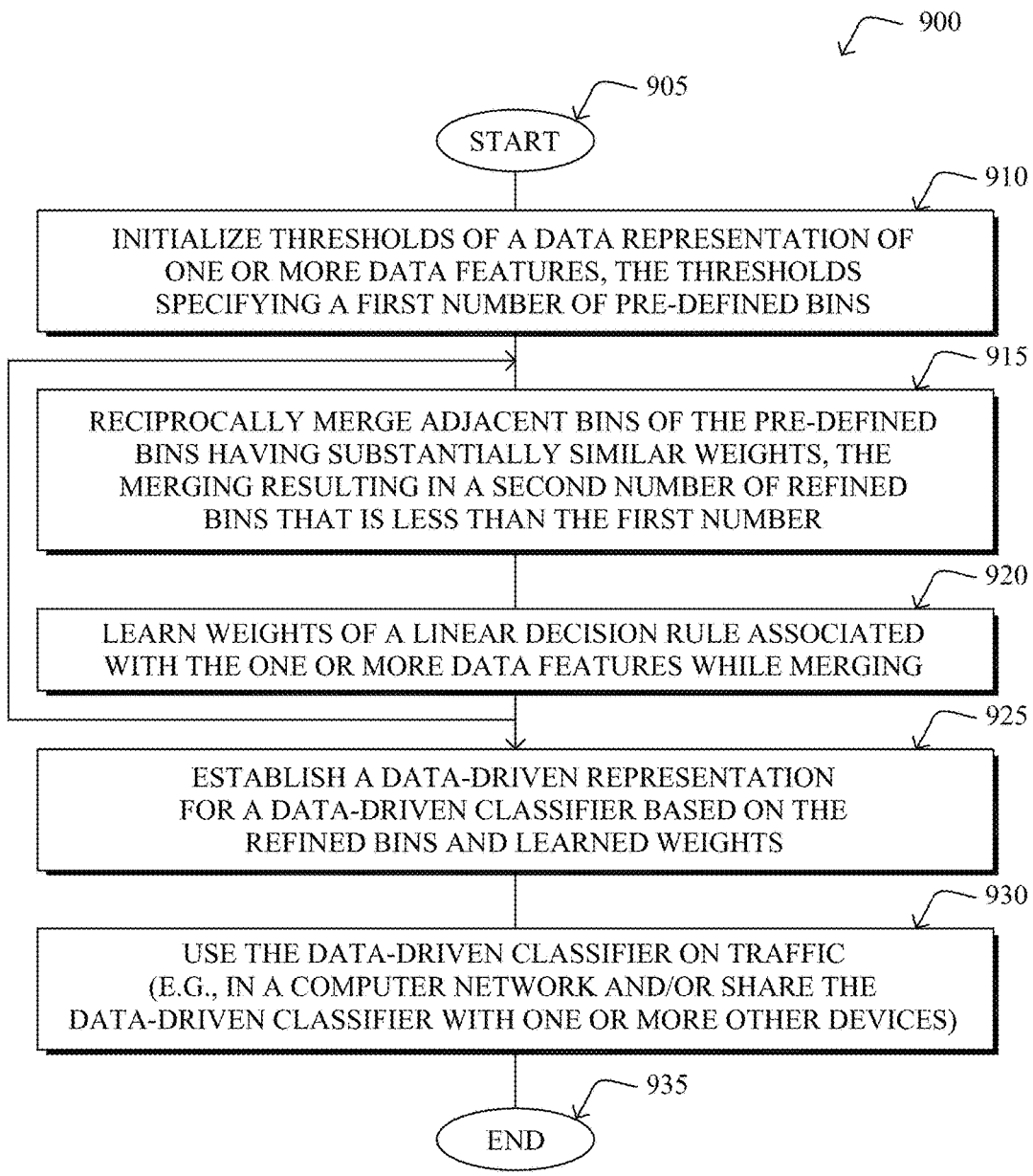
FIG. 9 illustrates an example simplified procedure for refined learning data representation for classifiers in accordance with one or more embodiments described herein.

FIG. 9 illustrates an example simplified procedure for refined learning data representation for classifiers in accordance with one or more embodiments described herein. For example, a non-generic, specifically configured device (e.g., device 200) may perform procedure 900 by executing stored instructions (e.g., process 248). The procedure 900 may start at step 905, and continues to step 910, where, as described in greater detail above, a learning machine device initializes thresholds of a data representation of one or more binarized or real-valued data features, the thresholds specifying a first number of pre-defined bins (e.g., uniform and equidistant bins). Note that where the features comprise a feature pair, correlation between feature values of the feature pair may be used for the data representation, as mentioned above.

As detailed above, in step 915 adjacent bins of the pre-defined bins that have substantially similar weights are reciprocally merged, where the merging resulting in a second number of refined bins that is less than the first number (i.e., consolidating the bins into a smaller number of bins). Substantially similar weights, as mentioned above, may generally comprise one or more of equal weights, similar weights, weights having a same sign, etc.

During the merging, in step 920, the device is also learning weights of a linear decision rule associated with the one or more data features. As such, in step 925, a data-driven representation for a data-driven classifier (e.g., a linear SVM) may be established based on the refined bins and the learned weights.

Once established, then in step 930 the device can use the data-driven classifier (e.g., on traffic in a computer network) and/or can share the data-driven classifier with one or more other devices (e.g., to then use the data-driven classifier).

The illustrative simplified procedure 900 may then end in step 935. It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for refined learning data representation for classifiers, which have general applicability and wide coverage to machine learning in general, though are also specifically relevant to network traffic data. In particular, the techniques herein simultaneously train optimal representation and linear weights in a joint optimization procedure, which uses a parameter to control the expressiveness and generalization of the representation.

It should be noted that representation learning, in general, is a widely studied topic (see, e.g., Bengio, Yoshua, Aaron Courville, and Pierre Vincent. "Representation learning: A review and new perspectives", *Pattern Analysis and Machine Intelligence, IEEE Transactions on* 35.8 (2013): 1798-1828). However, the techniques herein, notably, provide a highly computationally optimization to representation learning. In particular, as described above, the initial fine-grained discretization with many histogram bins is iteratively adjusted herein by optimizing a criterion function. When training a decision function, the algorithm herein optimizes the true objective (or its surrogate) which includes the discretization parameters with the parameters of the decision function. This is in contrast to previous methods that rely on two separate steps, discretization and classifier learning, which can deviate from the true objective. Additionally, the parameter learning is transformed herein into a convex optimization problem that can be solved effectively, while other techniques do not provide a global solution and resort to a greedy strategy, where the features are processed sequentially.

While there have been shown and described illustrative embodiments that provide for refined learning data representation for classifiers, it is to be understood that various other adaptations and modifications may be made within the spirit and scope of the embodiments herein. For example, the embodiments have been shown and described herein with specific relation to computer networks and network traffic classification. However, the embodiments in their broader sense are not as limited, and may, in fact, be used with other types of learning machines and classifiers. In addition, while certain formulas are shown, as well as specific inputs to such formulas, other suitable formulas and inputs may be used, accordingly. Also, while the techniques generally describe a convex programming based technique as a primary example, other techniques may be suitably applied for the techniques herein to be effective.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   initializing, at a learning machine device, thresholds of a data representation of one or more data features, the thresholds specifying a first number of pre-defined bins;
   reciprocally merging adjacent bins of the pre-defined bins having substantially similar weights, the merging resulting in a second number of refined bins that is less than the first number;
   simultaneously learning weights of a linear decision rule associated with the one or more data features while merging; and
   establishing a data-driven representation for a data-driven classifier based on the refined bins and learned weights.

2. The method as in claim 1, wherein the pre-defined bins are uniform and equidistant.

3. The method as in claim 1, further comprising:
   using the data-driven classifier on traffic in a computer network.

4. The method as in claim 1, further comprising:
   sharing the data-driven classifier with one or more other devices.

5. The method as in claim 1, wherein the data-driven classifier is a linear support vector machine (SVM).

6. The method as in claim 1, wherein substantially similar weights comprise one or more of equal weights, similar weights, and weights having a same sign.

7. The method as in claim 1, wherein the one or more features comprise a feature pair, and wherein correlation between feature values of the feature pair is used for the data representation.

8. The method as in claim 1, wherein the one or more features are binarized.

9. The method as in claim 1, wherein the one or more features are real-valued.

10. An apparatus, comprising:
    a processor configured to execute one or more processes; and
    a memory configured to store a process executable by the processor, the process when executed operable to:
    initialize thresholds of a data representation of one or more data features, the thresholds specifying a first number of pre-defined bins;
    reciprocally merge adjacent bins of the pre-defined bins having substantially similar weights, the merging resulting in a second number of refined bins that is less than the first number;
    simultaneously learn weights of a linear decision rule associated with the one or more data features while merging; and
    establish a data-driven representation for a data-driven classifier based on the refined bins and learned weights.

11. The apparatus as in claim 10, wherein the pre-defined bins are uniform and equidistant.

12. The apparatus as in claim 10, wherein the process when executed is further operable to:
    use the data-driven classifier on traffic in a computer network.

13. The apparatus as in claim 10, wherein the process when executed is further operable to:
    share the data-driven classifier with one or more other devices.

14. The apparatus as in claim 10, wherein the data-driven classifier is a linear support vector machine (SVM).

15. The apparatus as in claim 10, wherein substantially similar weights comprise one or more of equal weights, similar weights, and weights having a same sign.

16. The apparatus as in claim 10, wherein the one or more features comprise a feature pair, and wherein correlation between feature values of the feature pair is used for the data representation.

17. The apparatus as in claim 10, wherein the one or more features are binarized.

18. The apparatus as in claim 10, wherein the one or more features are real-valued.

19. A tangible, non-transitory, computer-readable media having software encoded thereon, the software when executed by a processor operable to:
    initialize thresholds of a data representation of one or more data features, the thresholds specifying a first number of pre-defined bins;
    reciprocally merge adjacent bins of the pre-defined bins having substantially similar weights, the merging resulting in a second number of refined bins that is less than the first number;
    simultaneously learn weights of a linear decision rule associated with the one or more data features while merging; and
    establish a data-driven representation for a data-driven classifier based on the refined bins and learned weights.

20. The computer-readable media as in claim 19, wherein the pre-defined bins are uniform and equidistant.

* * * * *